United States Patent [19]

Levine et al.

[11] Patent Number: 5,625,833
[45] Date of Patent: Apr. 29, 1997

[54] DOCUMENT ANNOTATION & MANIPULATION IN A DATA PROCESSING SYSTEM

[75] Inventors: Stephen R. Levine, North Andover, Mass.; Alex J. Harui, Derry, N.H.; Chia-Chuan Hsiao, Brookline, Mass.; Karen Donoghue, Melrose, Mass.; Michael W. Schirpke, Bedford, Mass.

[73] Assignee: Wang Laboratories, Inc., Billerica, Mass.

[21] Appl. No.: 406,818

[22] Filed: Mar. 20, 1995

Related U.S. Application Data

[63] Continuation of Ser. No. 305,909, Sep. 14, 1994, abandoned, which is a continuation of Ser. No. 46,374, Apr. 7, 1993, abandoned, which is a continuation of Ser. No. 396,739, Aug. 18, 1989, abandoned, which is a continuation of Ser. No. 200,091, May 27, 1988, abandoned.

[51] Int. Cl.$^6$ .............................. G06F 15/00; G06F 3/14
[52] U.S. Cl. ........................ 395/800; 395/761; 364/225.6; 364/DIG. 1
[58] Field of Search ........................ 395/800, 275, 395/147; 364/225.6, DIG. 1

[56] References Cited

U.S. PATENT DOCUMENTS

| | | | |
|---|---|---|---|
| 3,648,249 | 3/1972 | Goldsberry | 364/900 |
| 3,705,956 | 12/1972 | Dertouzos | 341/5 |
| 4,424,575 | 1/1984 | Clarke et al. | 364/900 |
| 4,475,239 | 10/1984 | Raamsdonk | 340/708 |
| 4,488,000 | 12/1984 | Glenn | 178/18 |
| 4,514,818 | 4/1985 | Walker | 364/571 |
| 4,528,988 | 7/1985 | Wong | 128/712 |
| 4,552,991 | 11/1985 | Hulls | 178/19 |
| 4,562,304 | 12/1985 | Ward et al. | 178/18 |
| 4,570,033 | 2/1986 | Hulls | 178/19 |
| 4,575,580 | 3/1986 | Jandrell | 178/18 |
| 4,577,057 | 3/1986 | Blesser | 178/18 |
| 4,580,007 | 4/1986 | Searby | 178/18 |
| 4,582,955 | 4/1986 | Blesser | 178/19 |
| 4,587,633 | 5/1986 | Wang et al. | 364/514 C |
| 4,616,336 | 10/1986 | Robertson et al. | 364/DIG. 2 |
| 4,633,416 | 12/1986 | Walker | 340/710 |
| 4,633,436 | 12/1986 | Flurry | 345/179 |
| 4,638,119 | 1/1987 | Blesser et al. | 178/19 |
| 4,644,102 | 2/1987 | Blesser et al. | 178/19 |
| 4,645,238 | 2/1987 | Vincent et al. | 283/67 |

(List continued on next page.)

FOREIGN PATENT DOCUMENTS

| | | |
|---|---|---|
| 159400 | 10/1985 | European Pat. Off. . |
| 60-218128 | 10/1985 | Japan . |

OTHER PUBLICATIONS

Goodman, Danny, *The Complete HyperCard Handbook* (Bantam Books 1987), pp. 32–34.
Microsoft Corporation, *Show Partner User's Guide* (1986), Chaps. 3, 4, pp. 27–48.

(List continued on next page.)

*Primary Examiner*—Alyssa H. Bowler
*Assistant Examiner*—John Harrity
*Attorney, Agent, or Firm*—Ronald J. Paglierani

[57] ABSTRACT

A data processing system provides annotation of a document with annotations inputted through an electronic tablet, a keyboard and an audio assembly. The annotations are entered in a modeless operation of the three input streams. Input by the tablet utilizes a two ended pen. One end of the pen is used for writing annotations to be added to a document and the second end of the pen is used for erasing the added written annotations. Files record the annotations made to the document in a manner which allows a time sequenced playback of the annotations including handwritten, typed and voiced annotations. A state machine of various procedures and controllers which call the procedures is used for processing the annotations as they are made, for replaying the annotations at a subsequent desired time, and for printing the annotations.

11 Claims, 19 Drawing Sheets

LOWER LEVEL DRIVERS

U.S. PATENT DOCUMENTS

| | | | |
|---|---|---|---|
| 4,649,380 | 3/1987 | Penna | 340/750 |
| 4,677,428 | 6/1987 | Bartholow | 340/724 |
| 4,688,031 | 8/1987 | Haggerty | 340/793 |
| 4,714,918 | 12/1987 | Barker et al. | 340/724 |
| 4,734,619 | 3/1988 | Havel | 340/700 |
| 4,755,809 | 7/1988 | Ikegami et al. | 340/724 |
| 4,899,136 | 2/1990 | Beard | 340/706 |
| 4,926,484 | 5/1990 | Nakano | 381/56 |
| 5,008,853 | 4/1991 | Bly | 364/900 |

OTHER PUBLICATIONS

"Macintosh MacPaint," copyright 1983, by Apple Computer, Inc., Cupertino, CA, pp. 1–32.

"Method for Creating Annotation Data," IBM Technical Disclosure Bulletin, vol. 28, No. 4, Sep. 1985, pp. 1623–1628.

"The Complete Book of Macintosh Assembly Language Programming," Weston, D., published 1987 by Scott, Foresman and Co., IL, pp. 27–147.

"The Small talk Environment" by Tesler, L., BYTE Magazine, Aug. 1981, pp. 90–144.

"The Lisa Computer System: Aplpe Designs a New Kind of Machine," by Williams, G., BYTE Magazine, Feb. 1983, pp. 33–50.

"The Lisa Computer System: Apple Designs a New Kind of Machine," by Williams, G., BYTE Magazine, Feb. 1983, pp. 33–50.

"Method of Multiple Selection of Icons On a Computer Display By Using a Pointing Device," IBM Technical Disclosure Bulletin, vol. 31 No. 1, Jun. 1988, pp. 19–20.

"Macintosh," published 1983 by Apple Computer, Inc., Cupertino, CA pp. 13–109 & 147–154.

"System for Integrating and Collating Audio and Text, and For Text Creation and Editing," by P.D. Welch, IBM Technical Disclosure Bulletin, vol. 16, No. 2, Jul. 1973, pp. 500–503.

"A Pair of Digitizing Tablets," MACWORLD, published Mar. 1987 by PCW Communications, Inc., San Francisco, CA, pp. 143–144.

"Put–That–There": Voice and Gesture at the Graphics Interface Richard A. Bolt, in ACM 1980, pp. 262–270.

"Designing the Star user Interface," by Smith, D.C.,et al., Byte Magazine, Apr. 1982, pp. 242–282.

"Visual Languages: A Tutorial and Survey," by Chang, Shi–Kuo, I.E.E.E. Software, Jan. 1987, v.4, No. 1, pp. 29–39.

Flow Chart Generator, Patent Abstracts of Japan, vol. 7, No. 198 (P–220) (1343) Sep. 2, 1983, JP–A–58–96360 (Abstract Only).

European Patent Application No. 0 203 314, Specifying Measurements On A Page By Pointing, IBM, Dec 3, 1986.

IBM Technical Disclosure Bulletin, Include Non–Text Objects In MArgin Text, vol. 30, No. 7, Dec. 1987, p. 348.

European Patent Application No. 0 249 494, Word Processing System With Means To Record and Playback Messages From An Operator Relating to the Text, IBM, Dec. 16, 1987.

```
Calendar/Reminder    Stephen R. Levine       Thursday    05/26/88  11:52 am1
Position cursor and press RETURN
         Thursday, May    26, 1988                        scheduled by
                                                      ┌──────────────────┐
                                                      │   GO TO DESK     │
■ 08:00 am  - 08:30 am  Jeff                          │▓▓ BLANK PAPER  ▓▓│
└ 08:45 am  - 09:00 am  To H.T. for Amy w/ Karen B   Stephen │▓▓ RULED PAPER ▓▓│─78
└ 09:00 am  - 10:00 am  Mtg. at Pat H. office        Stephen │▓▓ ERASE NOTES ▓▓│
└ 10:00 am  - 12:00 pm  Mary Lou here                Mary An│▓▓ SHRINK MENU ▓▓│
└ 10:30 am  - 12:00 pm  MEGASCAN at Burlington Marrit Stephen│▓▓ SHOW RULER  ▓▓│
└ 12:00 pm  - 01:00 pm  Rick Shriner                 Stephen │▓▓ PLAYBACK   ▓▓│
└ 01:30 pm  - 02:00 pm  Block time with Ellen Francik Mary An│   ALL DONE    │
└ 02:00 pm  - 03:00 pm  Block time with Alex and Mike Mary An└──────────────────┘
└ 03:00 pm  - 04:00 pm  ⌒Sammie  Please Cancel⌒      Stephen R. Levine
└ 03:30 pm  - 04:00 pm  pm Alex + inventions  This   Stephen R. Levine
└ 04:00 pm  - 05:00 pm  Sr. Staff Mtg. here  Meeting Mary Ann Karabatsos
                                      ↘300
                                                              ☐─163    (-End-)─61

This is sample keyboard annotation of an OFFICE screen (1) Change Day      (5) Next Day              (9) Week         (13) Instructions
(2) First item      (6) Add Event/↑ Reminder (10) Month       (14) Reminders
                    (7) Invitations          (11) Year        (15) Print
(4) Prev Day        (8) Delete Item(s)       (12) Change Name (16) Exit
```

Calendar/Reminder   Stephen R. Levine          Thursday   05/26/88  11:52 am1
Position cursor and press RETURN
         Thursday, May    26, 1988                        scheduled by ■ 08:00 am — 08:30 am  Jeff
└ 08:45 am — 09:00 am  To H.T. for Amy w/ Karen B        Stephen R. Levine
└ 09:00 am — 10:00 am  Mtg. at Pat H. office             Stephen R. Levine
└ 10:00 am — 12:00 pm  Mary Lou here                     Stephen R. Levine
└ 10:30 am — 12:00 pm  MEGASCAN at Burlington Marrit     Mary Ann Karabatsos
└ 12:00 pm — 01:00 pm  Rick Shriner                      Stephen R. Levine
└ 01:30 pm — 02:00 pm  Block time with Ellen Francik     Stephen R. Levine
└ 02:00 pm — 03:00 pm  Block time with Alex and Mike     Mary Ann Karabatsos
└ 03:00 pm — 04:00 pm  Sammie                            Mary Ann Karabatsos
└ 03:30 pm — 04:00 pm  Alex + inventions                 Stephen R. Levine
└ 04:00 pm — 05:00 pm  Sr. Staff Mtg. here               Stephen R. Levine
                                                         Mary Ann Karabatsos (-End-)

(1) Change Day       (5) Next Day              (9) Week         (13) Instructions
(2) First item       (6) Add Event/↑ Reminder (10) Month        (14) Reminders
                     (7) Invitations          (11) Year         (15) Print
(4) Prev Day         (8) Delete Item(s)       (12) Change Name  (16) Exit
                         ↙61

Fig 2d

```
Calendar/Reminder   Stephen R. Levine        Thursday    05/26/88  11:52 am1
Position cursor and press RETURN                       scheduled by
             Thursday, May    26, 1988

■ 08:00 am - 08:30 am Jeff
↳ 08:45 am - 09:00 am To H.T. for Amy w/ Karen B          Stephen R. Levine
↳ 09:00 am - 10:00 am Mtg. at Pat H. office               Stephen R. Levine
↳ 10:00 am - 12:00 pm Mary Lou here                       Stephen R. Levine
↳ 10:30 am - 12:00 pm MEGASCAN at Burlington Marrit       Mary Ann Karabatsos
↳ 12:00 pm - 01:00 pm Rick Shriner                        Stephen R. Levine
↳ 01:30 pm - 02:00 pm Block time with Ellen Francik       Stephen R. Levine
↳ 02:00 pm - 03:00 pm Block time with Alex and Mike       Mary Ann Karabatsos
↳ 03:00 pm - 04:00 pm Sammie  Please Cancel               Mary Ann Karabatsos
↳ 03:30 pm - 04:00 pm Alex + inventions This              Stephen R. Levine
↳ 04:00 pm - 05:00 pm Sr. Staff Mtg. here Meeting         Mary Ann Karabatsos
```

Typed erasure ▢ White characters
        163

This is sample keyboard annotation of an OFFICE screen

| | | | (-End-) |
|---|---|---|---|
| (1) Change Day | (5) Next Day | (9) Week | (13) Instructions |
| (2) First item | (6) Add Event/↑ Reminder | (10) Month | (14) Reminders |
| | (7) Invitations | (11) Year | (15) Print |
| (4) Prev Day | (8) Delete Item(s) | (12) Change Name | (16) Exit |

Fig. 2e

```
Position cursor and press return
         Thursday, May    26, 1988                                scheduled by ■ 08:00 am - 08:30 am Jeff
└ 08:45 am - 09:00 am To H.T. for Amy w/ Karen B              Stephen R. Levine
└ 09:00 am - 10:00 am Mtg. at Pat H. office                   Stephen R. Levine
└ 10:00 am - 12:00 pm Mary Lou here                           Stephen R. Levine
└ 10:30 am - 12:00 pm MEGASCAN at Burlington Marrit           Mary Ann Karabatsos
└ 12:00 pm - 01:00 pm Rick Shriner                            Stephen R. Levine
└ 01:30 pm - 02:00 pm Block time with Ellen Francik           Stephen R. Levine
└ 02:00 pm - 03:00 pm Block time with Alex and Mike           Mary Ann Karabatsos
└ 03:00 pm - 04:00 pm Sammie   Please Cancel                  Mary Ann Karabatsos
└ 03:30 pm - 04:00 pm Alex + inventions  This                 Stephen R. Levine
└ 04:00 pm - 05:00 pm Sr. Staff Mtg. here Meeting             Mary Ann Karabatsos 100 ──▶ ☜
                                                                    (-End-)
This is sample keyboard annotation of an OFFICE screen (1) Change Day      (5) Next Day              (9) Week         (13) Instructions
(2) First item      (6) Add Event/↑ Reminder (10) Month        (14) Reminders
                    (7) Invitations          (11) Year         (15) Print
(4) Prev Day        (8) Delete Item(s)       (12) Change Name  (16) Exit
                                      ◀─ 61

Fig. 2f
```

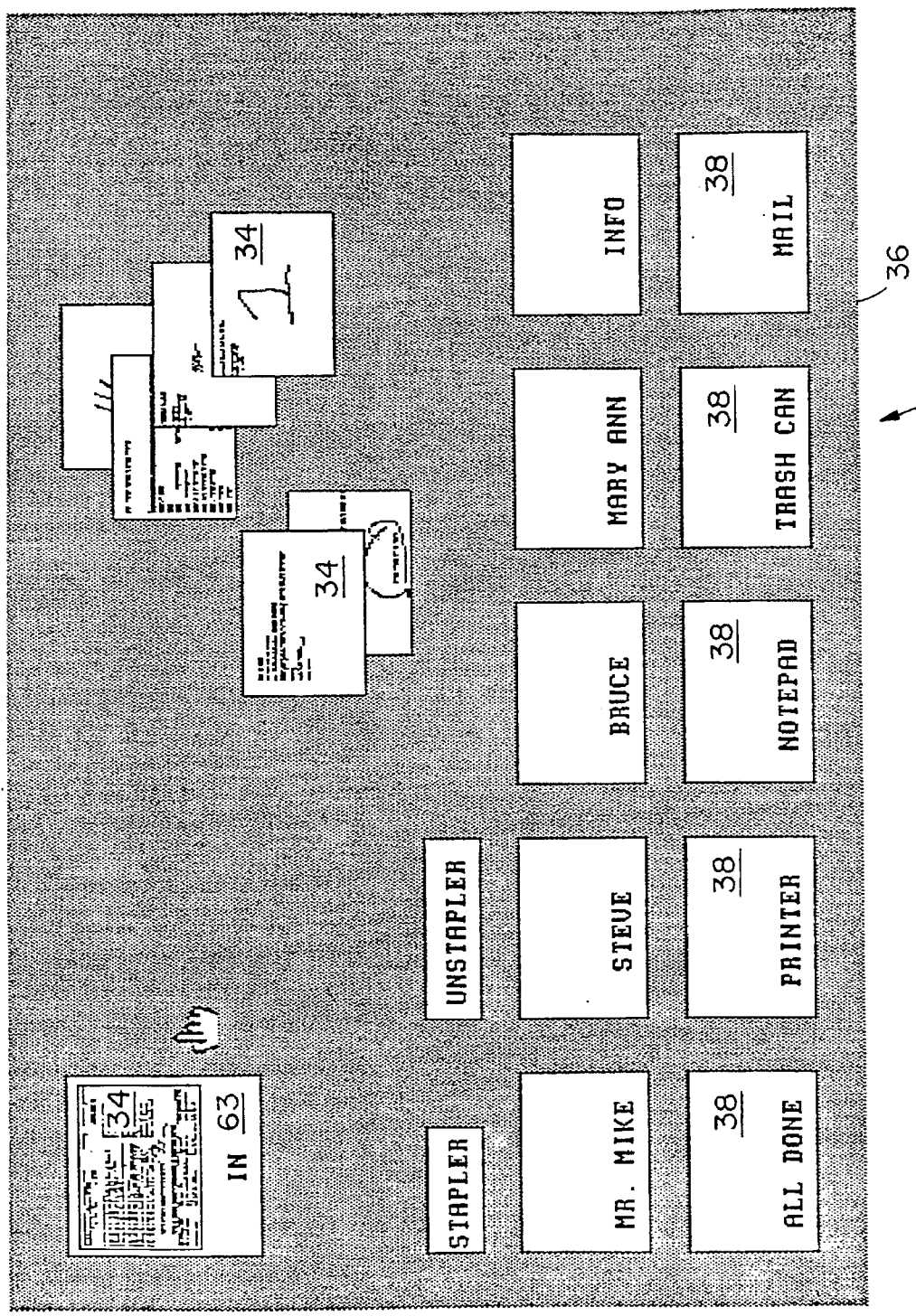

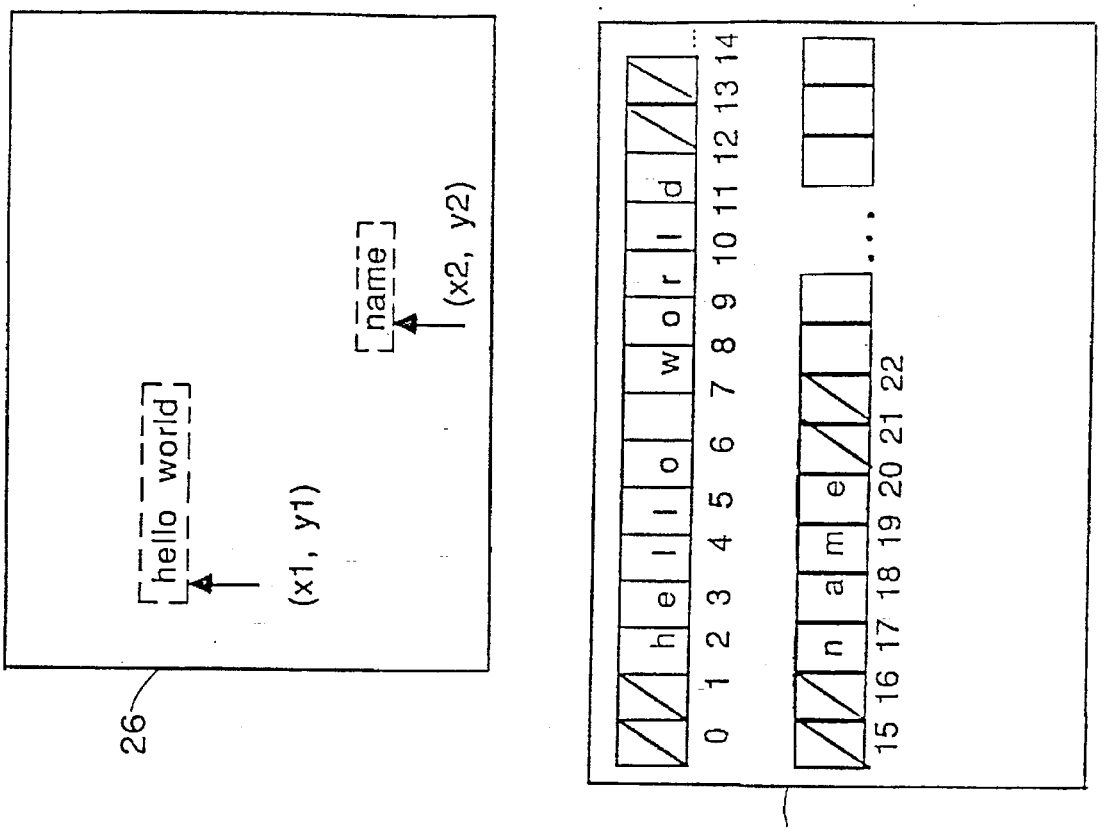
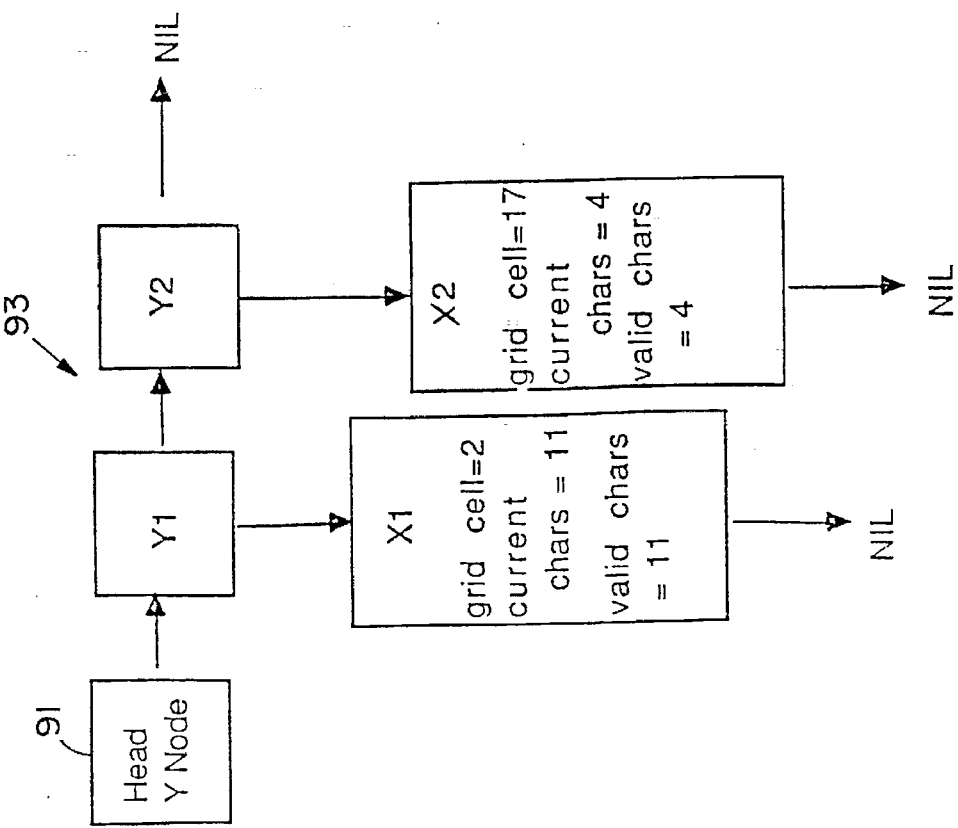
Fig. 3b

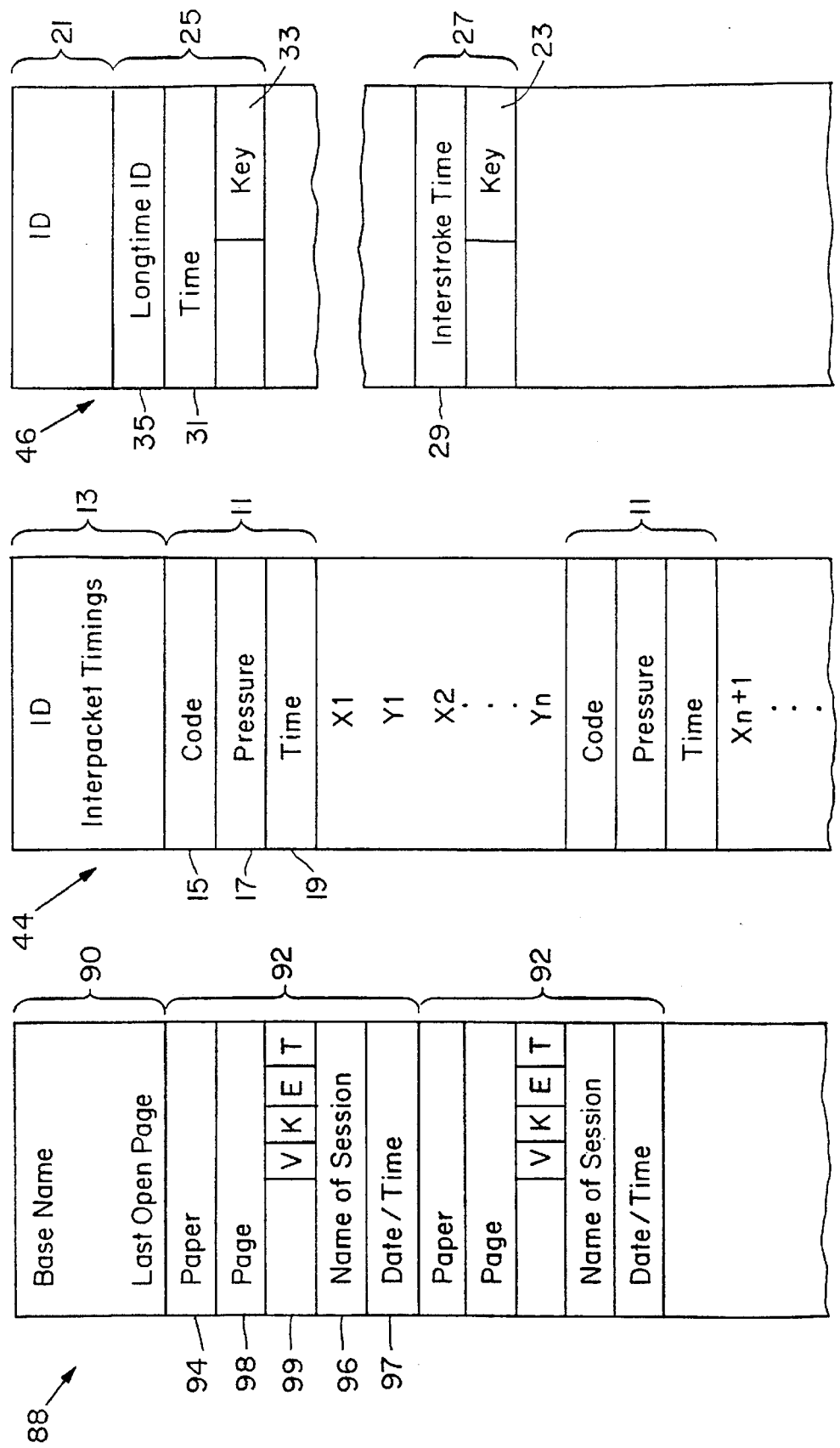

LOWER LEVEL DRIVERS

LOWER LEVEL DRIVERS

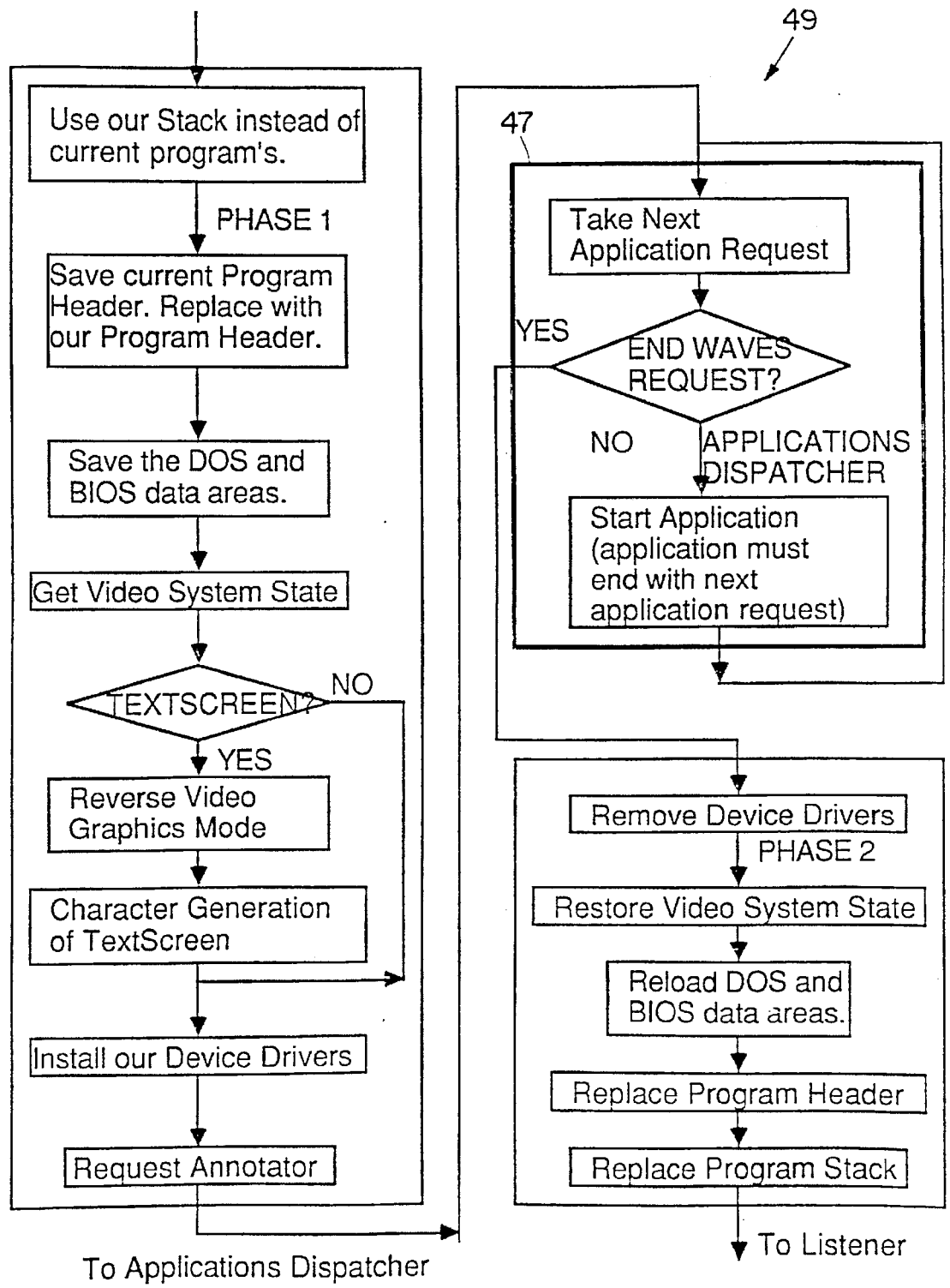
Fig. 10 TAKEOVER FLOW CHART

DOCUMENT ANNOTATION & MANIPULATION IN A DATA PROCESSING SYSTEM

This application is a continuation of application Ser. No. 08/305,909 filed Sep. 14, 1994, now abandoned, which is a continuation of application Ser. No. 08/046,374 filed Apr. 7, 1993, now abandoned, which was a continuation of application Ser. No. 07/396,739, filed Aug. 18, 1989, now abandoned, which was a continuation of application Ser. No. 07/200,091, filed May 27, 1988, now abandoned.

BACKGROUND OF THE INVENTION

In the business environment of today, many tasks are now automated by computers. For instance, a word processor enables the reorganizing and rewriting of documents without the retyping known in the past. In addition, various documents may be organized and stored by a computer filing system which allows retrieval by name, by chronological or alphabetical order, or by other user-desired identification. Another example is a mail system on a network of computer terminals which allows messages to be sent to and from users of the network. Also, a phone system may be connected to a mail system which in turn enables phone messages to be stored and later forwarded to users. These and other computer devices enable various daily office tasks to be accomplished more quickly and more efficiently.

However, most computer devices require the user to be computer literate and to learn commands to direct the computer to perform a certain task. In more recent computer developments, menus (a series of commands from which to choose) are displayed to the user at appropriate decision junctures during the use of a computer device. The menus are considered to make the computer device more "user friendly". Generally the choices on a menu are descriptive phrases written in terms which are more common to our everyday language rather than in a coded or technical computer language. Even so, the descriptive phrases may not initially have meaning, or at least the proper meaning, to a first-time user or a user who is not computer literate. Thus, many office personnel do not make use of computer devices because of the time and complexity required to learn to operate these devices.

Accordingly, there is a need to make computer devices, and particularly those for office use, more initially "user friendly" or readily useable especially to first-time and computer illiterate users.

SUMMARY OF THE INVENTION

The present invention introduces a computer device which is a degree "friendlier" than the menu driven computer devices of today. The present invention provides an electronic stylus and electronic tablet which emulate a pencil and desk pad of paper used by the common businessperson. The electronic stylus and tablet are associated with a terminal of a digital processing system which has a monitor screen for displaying the strokes input by the electronic stylus and those input by a keyboard. An audio input/output assembly may also be connected to the terminal to provide voiced or other audio input to the digital processing system.

The tablet serves as the writing surface on which the stylus is used, and spatially corresponds in a one-to-one fashion with the view exhibited on the monitor screen. The tablet may be an integral part of the monitor screen in which case the tablet is a transparent surface over the screen or is the screen itself. In a preferred embodiment, the tablet is an element separate from the monitor screen.

Different manners of use of the stylus produce different effects which are the same or similar to those one would expect from such usage of a common pen or pencil. Specifically, the various effects or functions of the stylus are produced without explicit associated commands or without knowingly placing the stylus in respective modes. That is, the stylus may be operated at any one time to produce the various functions without an explicit user request to change modes and without particular commands of operation to a processor. Such a seemingly modeless, commandless format makes the system easy to understand and thus readily usable by even the most non-computer oriented, untrained user. Hence, the system is a very "user-friendly" system.

In general, the user interacts with the processing system through the stylus and tablet in four methods of use of the stylus. In the first method, the writing tip end or the eraser end of the stylus is briefly touched on (i.e. touched on and lifted from) the position on the tablet corresponding to the position of a desired item displayed on the monitor screen. Such a "touch and lift" use of the stylus causes the desired displayed item to be selected for further use by the user. In a second method of use of the stylus, the writing tip end or the eraser end of the stylus is touched on the position on the tablet which corresponds to the position of a desired displayed item and moved across, while remaining in contact with, the surface of the tablet to move the displayed item to a different position in the view on the screen. This method of stylus use is referred to as "touch and move". In a third method of stylus use, the user writes with the writing tip end of the stylus in the same manner as he would write with a pencil or pen. Such writing generates strokes of the stylus which result in penned or handwritten annotations, as opposed to typed or voiced annotations, to a displayed document. The fourth method of use involves the eraser end of the stylus and provides for the erasure of penned annotations generated by the writing tip end. The eraser end is used in the same manner as a pencil eraser. Thus, interaction with the processing system through the stylus and tablet is accomplished through natural and known movements and strokes with which any person is familiar and comfortable.

Within each view displayed on the monitor screen, cursor indications of the various operations of the stylus on the tablet are provided. For example, a cursor replicating a sharpened pencil tip is displayed when the writing tip end of the stylus is used or is about to be used for writing, and an eraser cursor is displayed when the eraser end of the stylus is about to be used or actually in such use. A cursor replicating a hand with the index finger positioned in a pointing fashion is displayed when either end (i.e. the writing tip end or eraser end) of the stylus is used in the "touch and lift" method for selecting a displayed item. A close-fisted hand cursor appears to grasp a document or other item when the writing tip end or eraser end is used to move the displayed item. Other cursors may be used to provide an illustrative indication of the functions and use of the stylus.

There are two major views which are viewed on the monitor screen by the user during use of the stylus, a desk view and an annotation session view. Of course, the terminal keyboard and monitor screen may be used to run various programs and provide numerous other functions, and hence, other views may be viewed on the monitor screen. The desk view emulates a user's desk and pieces of paper which are stacked on and moved about his desk. In a preferred embodiment, the desk view shows a stamp which is a reduced or miniaturized image of an actual page of each document presently on the user's system desk or computer work area. Each stamp serves as a unique direct pictorial representation of a certain document on the user's system desk as opposed to an indirect indication, such as a prefabricated standard icon which is used for all documents of a certain type and which identifies a specific document only by a name or title associated with the icon. The stamps can be stacked and rearranged on the system desk by the user manipulating stamps one at a time with the "touch and move" method of use of the stylus described above.

The annotation session view, the second major view associated with use of the stylus, provides a full-screen-sized view of the document to be annotated or created by the stylus, by the keyboard and by voiced data input through the audio input/output assembly. The document to be annotated may be chosen in three different manners. In one way, the document may be chosen from a program being currently run by the operating system. The user simply places one end of the stylus within a predetermined proximity of the surface of the tablet. When such proximity is sensed, the currently running program is temporarily stopped, preferably by a microprocessor interrupt, and the view from that program being displayed at that time becomes the document to be annotated. In preparation for annotation, if the screen is currently in a text mode, as opposed to a bit-map mode, the data processing system changes the screen to a bit-map or graphics mode. Text is converted to graphics by a character generation scheme. Also, the dark background with light print of the text mode is reversed to a light background with dark print to more effectively simulate print on paper. Once prepared for annotation, the document may be annotated with visual annotations input through the stylus and/or keyboard and/or with audio annotations input through the audio input/output assembly. At the end of the annotation session, (i.e., the period during which all such annotations are made to one document before changing to another document, or before returning to the desk view or the first-running program), the running of the first program may be resumed from the point where it was stopped. Alternatively, the user may view the desk view immediately after annotating/creating the document. In either case, a stamp of the annotated document is placed on the user's system desk. Preferably, the stamp is placed in an "In box" on the system desk.

Preferably, the entire annotation and desk task is performed in the microprocessor interrupt. The software executed by the operating system for providing the functions of the desk view and annotation sessions (i.e. the annotation-desk task program) may be loaded into local memory by a swapping scheme. Before the annotation-desk task program is loaded into local memory in place of a primary task (i.e., the first-running program), the primary task is saved in a remote memory and the state of the primary task is saved such that upon completion of the annotation-desk task the running of the primary task may be resumed.

A document to be annotated may also be chosen from the user's system desk (i.e., the desk view). When viewing the desk view, the user touches and lifts one end of the stylus on the position on the tablet which corresponds to the position on the user's system desk of the stamp of the desired document After the "touching and lifting" a full-screen display of the desired document is exhibited on the monitor screen and is ready for annotation by typed data input through the keyboard, handwritten/erased data input through the stylus, and voiced data input through the audio input/output assembly. After the annotation session of this document, the corresponding stamp on the system desk is updated to include the recently made visual annotations (i.e. handwritten, erased and typed).

Thirdly, a document may be created and annotated by the user selecting a "note pad" option displayed in the desk view. To select the "note pad" option, the user touches and lifts one end of the stylus on the position on the tablet corresponding to the area labeled "note pad" in the desk view. The user is thereupon provided with a blank screen, or other screen of a predefined format, which represents a clean page on which annotations are to be made to form a new document. Annotations may be made as with any other document through the stylus, keyboard and audio input/output assembly. At the end of the annotation session, a stamp of the created document is generated and placed on the user's system desk and preferably is placed in the "In box" on the system desk.

In a preferred embodiment, a cursor corresponding to the keyboard is provided in the view of the document being annotated. The keyboard or typing cursor may be an upright rectangular box or other indicator of the position where typed input would be currently placed if the user operated the keyboard. The user is able to move and reposition the typing cursor with the "touch and move" method of operation of the stylus. The user simply places one end of the stylus on the tablet position which corresponds to the position of the typing cursor in the displayed view of the document being annotated and moves the stylus end across the surface of the tablet to the desired position. In turn, the typing cursor is correspondingly moved across and repositioned in the view displayed on the screen. The moveable typing cursor also does not restrict typing to particular lines and spaces within the lines as existing word processing/typing devices do with global grids of character spaces covering the whole document. This ability to freely move the typing cursor independent of a global grid structure enables the user to quickly complete specific portions of a document especially when the document is a standard company form.

In a preferred embodiment, the typing cursor at each initial cursor position beginning a sequence of typed annotations, establishes a local grid of character spaces for holding the sequence of characters independent of any global grid. Also, each local grid is independent from other local grids. Overlap of local grids is prevented by close positioning of the typing cursor relative to an existing local grid causing the typing cursor to be automatically positioned within the existing grid. In addition, the local grids are established by a linked two-dimensional list of y and x nodes which establish the initial cursor position of each local grid, the y nodes corresponding to lines of the document and the x nodes corresponding to character spaces or location of a set of characters within a line. To identify the characters in each local grid, each x-node of the x-y node list points to a sequence of characters in a grid buffer which stores all characters typed into the document through the keyboard.

For proper eye hand coordination, it is important that there be little delay in displaying stylus strokes and keyboard generated annotations. To that end, it is preferred that annotation input through the stylus and keyboard be handled as an interrupt to the microprocessor running the annotation task program. Thus, where the document to be annotated was chosen from a running program, there are layers of interrupts. The first interrupt is to the first running program to enable execution of the annotation task program. The second and succeeding interrupts are to the annotation task program, to process data input through the stylus and/or keyboard. During the first interrupt but outside of the second level interrupts of the annotation task program, data inputted during the annotation session may be written to secondary storage. By writing to secondary storage outside of these second level interrupts, the processing of annotations is not retarded by the waiting time associated with writing to secondary storage. Instead, these interrupts have priority over the task of writing to secondary storage.

Also during each annotation session, a pop-up menu is displayed and provides a limited number of optional actions that the user may select. Preferably, the options include "go to desk", "all done", "blank paper", "ruled paper", "erase notes", and "playback" among other options. The first two options end the annotation session and return the user to the system desk or first running program respectively. Each of the next two options provide the type of a new piece of paper on which the user desires to make annotations and begins a new annotation session for that new piece of paper. In addition, selection of either "blank paper" or "ruled paper" during an annotation session of a first document causes the first document along with all annotations made to it during that session to be saved, and the corresponding stamp of the first document to be updated accordingly and placed in the "In Box" on the system desk. The "erase notes" option causes all annotations (visual and audio) made to a currently displayed document during an annotation session to be deleted such that the document is displayed in its initial form from the start of the annotation session. The "playback" option displays the initial form of the current document at its origination followed by a time sequence of the annotations made to the document up through and including the present annotation session.

The user indicates his choice of an option from the pop-up menu by touching and lifting either end of the stylus on the position on the tablet which corresponds to the position of the desired option in the view exhibited during the annotation session. The user may also move the pop-up menu to any position on the screen using either end of the stylus in the touch and move method of use. Once moved to a new position, the pop-up menu remains in that position until moved again either in the current annotation session or any succeeding annotation session. In addition, other options concerning the size of the menu or indications of margins of the document may be included in the pop-up menu as is known in the art.

During an annotation session, the eraser end of the stylus enables the user to erase penned or handwritten annotations (i.e. annotations generated by the writing tip end of the stylus) made during that session. Penned annotations input during previous annotation sessions and all typed annotations are unaffected by the stylus eraser. The area on the document which has presently been erased by the stylus eraser is restored to its initial form from the beginning of the annotation session plus any typed annotations from the current annotation session. In particular, if the document is a new blank or ruled page, then erasure of an annotation produces an unmarked blank or ruled spot, respectively plus any typed annotations made to the document in that spot.

In the preferred embodiment, an off-screen bitmap copy of the document from the beginning of the annotation session is saved. An on-screen bitmap is used during the annotation session to display the document and annotations currently made to it. When the user applies the stylus eraser, an eraser path is formed on the document. The parts of the penned annotations made during the current annotation session which are intersected by the eraser path determine an erased area. The portion of the on-screen bitmap which corresponds to the erased area is replaced by the corresponding area of the off-screen bitmap, and characters resulting from typed annotations previously made to the erased area during the current annotation session are accordingly redrawn in the on-screen bitmap. The erased area of the document is then displayed to the user as it initially was at the beginning of the annotation session with the addition of currently typed annotations and produces the effect of having erased selected parts of the current annotation sessions penned annotations.

In sum, meeting the user's intuitive expectation, typed annotations and/or complete strokes of the penned annotations are not erased but rather only those parts of penned annotations over which the eraser has passed are erased in a manner similar to a common eraser erasing pencil markings. In the same light, the width of the eraser's effective path is preferably wider with the user applying the eraser end to the tablet with greater pressure.

All annotations of a document during an annotation session are sequentially recorded in the relative time sequence in which they were made and with information concerning individual paces at which they are made. This allows subsequent replay of the annotations in the order and/or at the relative paces in which they were made, a particularly powerful tool in replay where voice/audio annotations are synchronized with and accompanied by penned and/or keyboard annotations as they were originally performed.

In a preferred embodiment, all strokes (i.e. "tablet felt" movement of the part of the stylus in contact with the tablet) and gestures (i.e. movement of the stylus in the air, that is, when the stylus is not in contact with the tablet) of the writing tip and eraser end of the stylus are automatically recorded in a "tablet" file of the computer (i.e. digital processor). All keyboard strokes are recorded in a "keyboard" file, and all voiced/audio data is recorded in a "voice" file. Each of these files contains the respective type of data input during the annotation session and time marks or other indications of relative time of occurrence of the input of that data. For example, the tablet file may contain a series of digitized x-y coordinates of one of the ends of the stylus. Each series is separated by a delimiter which provides an indication of whether that end is beginning or ending a stroke or gesture and the time at which action of this end of the stylus occurred. The tablet file may also contain for each point of a stylus stroke on the tablet digitized values of height of a stylus end above the tablet, pressure of that end on the tablet, and/or an indication of which end (writing tip or eraser) is on or near the tablet.

The keyboard file may contain each key stroke and an interstroke time where typing comes fast enough that keystrokes are separated by less than about half-minute intervals. Where the interstroke time is longer than 32,767 milliseconds, the time of occurrence is recorded along with the series of key strokes inputted through the keyboard.

The voice file simply records the voiced data in a digitized form and has an indication of the time at which that data was input relative to the time that other data was input through the stylus and keyboard. A silence compression scheme may also be employed with the recording of voiced data in the voice file to save memory space. In that case, during replay a noise generation scheme may be used to replace the moments of silence which were compressed. Preferably the noise generation scheme replaces the moments of silence with noise at a volume which is determined by the original noise level of the respective moments of silence.

Further, all tablet, keyboard and voice files per annotation session are catalogued in a table of contents file referred to as a superfile. The superfile serves as the table of contents of all annotation sessions and files from each annotation session associated with a particular document. The superfile also references the stamp file of the document and other files of the document as needed.

The superfile and the files containing annotations to the document referenced by the super file are used to provide a time sequenced playback of the annotation sessions of a document as already mentioned. When a user selects for viewing a document from the desk view, the user touches and lifts one end of the stylus on the position on the tablet which corresponds to the position of the stamp of the desired document on the system desk. In turn, the document may be displayed from its original form, from the creation of the document, and in each form thereafter as changed by each annotation session of the document and at the pace that each annotation was made to the document. Hence, the playback is time sequenced with respect to the timing in which the annotations were actually made during respective annotation sessions. Thus, the user views a real time playback of all data input to the document, including voiced data. This enables the viewer to not only follow the creation of the annotations (erasures as well as insertions) but also to view visual indications made to the document while listening to voiced information which may correspond to the visual indications. Such a combination of visual and audio information provides the effect of the annotating person actually being in the presence of the viewer during playback delivering written and audio information relative to the document.

With respect to the technical or working elements of the invention, the processing of annotations is handled by a dispatcher for the tablet, a dispatcher for the keyboard and two groups of procedures respectively employed by the dispatchers. Each dispatcher receives input data and passes the data to a procedure which is referenced by a changeable output designator of the dispatcher. The procedure which receives the input data processes the input data and changes the output designator of the dispatcher to reference a procedure to process subsequent input data according to the present state of the annotation session.

The foregoing arrangement provides a state machine for not only processing annotation input data but also for displaying a replay of or for printing the annotated document. In the preferred embodiment the tablet dispatcher may receive the input data directly from the tablet and stylus or from a tablet file. Similarly, the keyboard dispatcher may receive input data directly from the keyboard or from a keyboard file. Corresponding with the input to the state machine (i.e., dispatchers and groups of procedures) the output of the state machine may be received by a screen manager for displaying the processed data on the screen display for initial viewing or replay, or by a print manager which causes the processed visual data to be printed on a printer. To that end, printing of the displayed document with typed annotations is accomplished by providing to a printer buffer a sequence of all typed characters and typed erasures (overstrikes), resulting from the typed annotations, with respective positions relative to the document, in the same sequential order in which they were input through the keyboard and not by order of position of the characters in the document.

There are also novel technical features of the stylus and tablet. The stylus is two-ended; that is, the stylus has a writing tip end and an eraser end. Although not required technically, and arguably a cause of unnecessary stylus movement for erasure, the two-ended pencil-like configuration makes the stylus immediately familiar to and thus acceptable by any user. Alternatively, the two ends provide different functions such as writing in different colors or producing other effects.

Preferably, a tablet processor electronically drives the two ends of the stylus alternately until one is sensed to be within proximity of the tablet. The status of the stylus is then characterized from detected pressure of one end of the stylus and distance of that end away from the tablet surface along a z-axis which is perpendicular to the tablet surface. That is, the position in 3-D space and motion of the stylus during use with the tablet (e.g. beginning of a stroke, end of a stroke, "touch and lift" motion, ending portion of the "touch and move" motion, writing, erasing) is determined from the detected pressure and z-axis factors. In a preferred embodiment, the pressure is detected by a pressure transducer in the stylus, and the distance away from the surface of the tablet along the z-axis is detected by a dedicated circuit or a sensing coil in the tablet. Another circuit in the tablet detects the position of one end of the stylus along x and y axes in or near the plane of the writing surface of the tablet.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

FIG. 1c is a block diagram of a tablet employed in the system of FIG. 1a.

FIG. 2a is an illustration of a view displayed during annotation with the data processing system of FIG. 1a.

FIG. 2b is an illustration of the desk view employed in the data processing system of FIG. 1a.

FIGS. 2c–2g illustrate a sequence of views displayed from invocation of an annotation session during a running program to the end of the annotation session which returns to the desk view of FIG. 2b.

FIG. 3a is a schematic of the working software elements of the data processing system of FIG. 1a.

FIG. 3b is a schematic of the software for keyboard annotations in the data processing system of FIG. 1a.

FIG. 4 is an illustration of a superfile of the system of FIG. 1a.

FIG. 5 is an illustration of a tablet file of the system of FIG. 1a.

FIG. 6 is an illustration of a key file of the system of FIG. 1a.

FIG. 8 is a schematic of the device drivers employed by the system of FIG. 1a.

FIG. 9 is a flow chart of the Listener routine of the system of FIG. 1a.

FIG. 10 is a flow chart of the Takeover routine of the system of FIG. 1a.

FIGS. 11 and 12 are flow charts of the Supervisor and interrupt routines for processing input data during an annotation session in the system of FIG. 1a.

FIG. 13 is an illustration of contents of a voice buffer of the system of FIG. 1a.

DETAILED DESCRIPTION OF THE PREFERRED EMBODIMENT

Figure 1A:
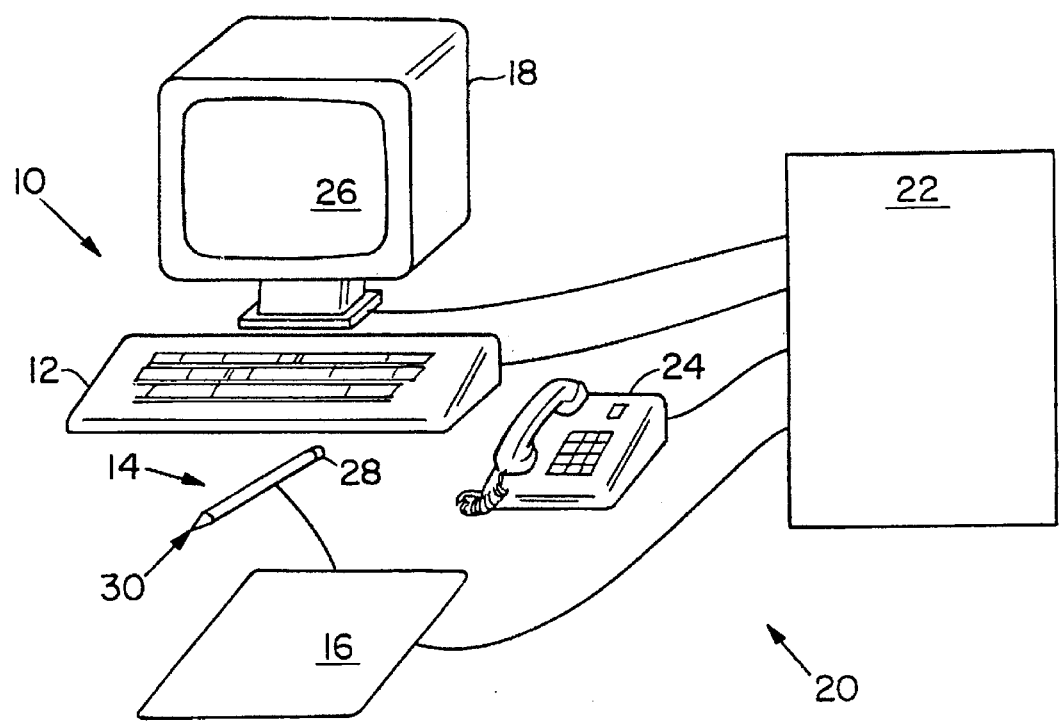
FIG. 1a is a schematic view of a data processing system which embodies the present invention.

A data processing system which embodies the present invention is illustrated in FIG. 1a. The system 20 includes a computer terminal 10 with a keyboard 12 and a display unit 18, a two-ended electronic stylus 14 and an electronic tablet 16, all of which are connected to and driven by a digital processor 22. Digital processor 22 may be of the multitask type but a single task type is assumed in the description of the preferred embodiment. Preferably a audio assembly 24 having input and output ports, such as a telephone set, is also connected to the terminal 10 for combining voice with visual annotations input through the stylus 14 and keyboard 12.

The stylus 14 is used on an upper planar surface of the tablet 16 to perform certain tasks such as writing a message and correcting a part thereof, creating a new document, or retrieving and annotating an existing document. The actions of the stylus 14 on the surface of the tablet 16 are displayed on the display unit 18 and the positions on the tablet have a one to one correspondence with the view 26 displayed on the display unit 18. Thus, as the user applies the stylus 14 to the tablet surface, an image representation of what the user is doing with the stylus is provided in the view 26 of display unit 18.

It is understood that display unit 18 provides a video display and not a panel of light indications. Also display unit 18 is not limited to a raster type CRT and may be of an LCD or gas plasma type display unit or of other display technology.

Figure 1B:
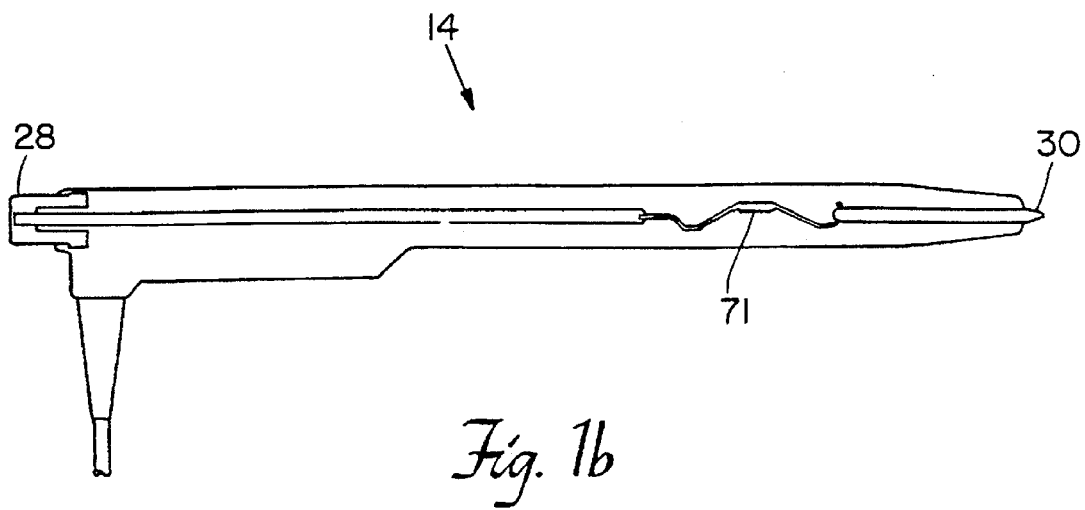
FIG. 1b is a longitudinal section of a two ended stylus employed in the data processing system of FIG. 1a which may be cordless or wired to a tablet.

The electronic stylus 14 and tablet 16 are generally of the type described in U.S. Pat. Nos. 4,644,102, 4,582,955 and 4,577,057 all to Blesser et al. In such systems, the tablet includes a grid of conductive elements and the stylus contains an electric coil. The coil in the stylus is inductively coupled to the grid in the tablet by energizing either the coil or the grid with an AC voltage signal. The voltage signal induced in the other component is then measured and used to determine the position of the stylus relative to the grid. The unique features of the electronic stylus 14 and tablet 16 of the present invention are presented next in conjunction with FIGS. 1b and 1c.

The two-ended stylus 14 operates from either end, the writing tip end 30 or the eraser end 28. When in close proximity (about 2 cm or less) to the surface of the tablet 16 the writing tip end 30 is sensed and indicated in the view 26 of display unit 18 by a cursor 300. The cursor 300 depicts a sharpened pencil tip in the preferred embodiment as shown in FIG. 2a. Two factors are used in sensing the proximity of the writing tip end 30 of the stylus 14 to the surface of tablet 16. The factors include a height position along an axis perpendicular to the tablet surface (i.e. z-axis) as detected by circuits 69 (FIG. 1c) of the tablet 16 and a pressure indication sensed by a pressure transducer 71 (FIG. 1b) in the stylus 14. The same factors are used in determining the proximity of the eraser end 28 of the stylus 14 to the tablet surface, pressure of the eraser end 28 also being detected by pressure transducer 71. When the eraser end 28 is in proximity of the tablet surface, an indication, such as a cursor 280 depicting a pencil top eraser (FIG. 2e), is displayed in the view 26 of display unit 18 at the position corresponding to the position of the stylus eraser end 28 on the tablet surface. For reasons discussed below, independent z-axis and stylus-end pressure factors are determined.

Figure 1C:
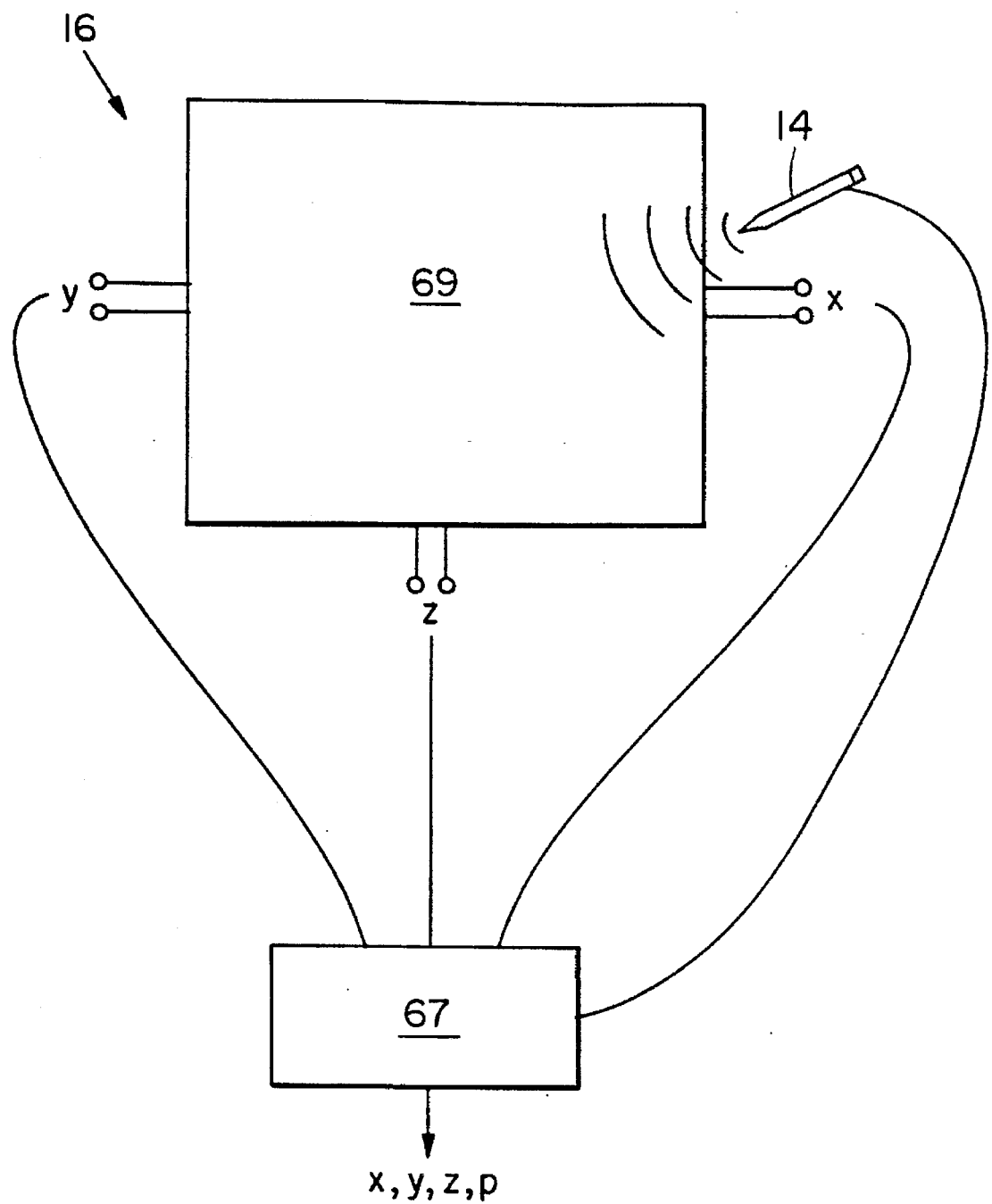

To accomplish the foregoing, the tablet 16 comprises an x- and y-axis sampling circuit, where x and y are orthogonal axes in the plane of the tablet surface, and a separate z-axis sampling circuit. It is understood that a multiplicity of loop configurations for the sensing coils forming the x and y and the z sampling circuits are known in the art. Hence, FIG. 1c provides a block diagram of tablet 16 with blocked area 69 generally referring to the sensing coils of the x and y and z sampling circuits. It is noted however, that positional phase discrepancies of the tablet sensing coils can be corrected computationally in tablet processor 67 or by a higher resolution loop such as a separate z-axis sensing loop used in the present invention. The x- and y-axis and z-axis sampling circuits operate on a predetermined schedule and generate signals at x, y and z in FIG. 1c. The signals are subsequently received and digitized into respective quantitative values by tablet processor 67. The digitized values are used by processor 22 (FIG. 1a) in a relationship known in the art to provide an indication of position of the stylus 14 relative to the tablet 16 along the x, y and z axes.

In the preferred embodiment the z-axis sampling circuit senses stylus end height and transfers indicative signals to tablet processor 67 which transmits z-axis height values to processor 22. Along with the z-axis values, tablet processor 67 transmits to processor 22 quantitative, multivalue pressure measurements p (FIG. 1c) and corresponding x- and y-axis values for the stylus end. The processor 22 uses the transferred height and pressure values to determine proximity of the stylus end in relation to the tablet surface. It is noted that such a determination is based on multivalue, quantitative measurements in contrast to qualitative, yes/no indications used in existing devices.

In addition, the writing tip end 30 and the eraser end 28 of the stylus 14 are alternately driven by tablet processor 67 (FIG. 1c). When one end is moved into and sensed in proximity of the tablet surface, then just that end is driven. When the writing tip end 30 is in proximity of the tablet surface, it alone is driven and responds to three different manners of operation to provide three different effects. A "touch and lift" operation of the writing tip end 30 is used for selecting an item. Preferably, once the writing tip end 30 makes contact with the tablet surface, the "touch" part of the operation is defined but the user must lift the tip end 30 from the tablet surface within the succeeding second or so to define the "lift" portion of the operation. If the user delays in lifting tip end 30, then the "touch and lift" operation of writing tip end 30 is not invoked and no effect results. A "touch and move" operation enables the user to move a displayed item anywhere in view 26 of display unit 18. The operation is invoked upon the user placing the writing tip end 30 on the tablet surface and moving the tip end 30 while maintaining it in contact with the tablet surface for more than a preset number of pixels, for example about 4 pixels. The third manner of operation is writing with the writing tip end 30 of the stylus 14 to insert markings on a chosen displayed document. The use and effect of these writing tip functions will be further discussed later.

The eraser end 28 when in proximity of the tablet surface is driven alone to provide the "touch and lift" and "touch and move" operations and effects thereof similar to the writing tip end 30. The eraser end 28 when driven alone also allows operation in a manner which is similar to the writing function of the writing tip end 30. However, instead of inserting markings, the eraser end 28 removes desired parts of markings which have been made by the writing tip end 30 within the same session of writing/erasing on a chosen displayed item. Further, the eraser end 28 removes markings in a wider band than the band in which the writing tip end 30 writes. The eraser end 28 may thus be thought of as wide-ended and the writing tip end 30 may be thought of as a fine point pen end.

The two ended stylus may be cordless in one embodiment but is not limited to such. In other embodiments, the two ends of stylus 14 may provide different functions other than writing and erasing.

Generally, the communication system 20 provides two environments in which annotation and manipulation of documents is performed. One environment is best described as a computer work area called the user's system desk which contains images of all the documents in the user's possession. The second environment provides a view of a single selected document including a new document and enables annotation or creation of that document with stylus-written/erased, keyboard-typed and audio inputted annotations.

The second environment is referred to as the "annotator" and may be invoked from any view on display unit 18 at any time. For example, the annotator may be invoked during a working program. In that case, the annotator is invoked by the user placing the writing tip end 30 or eraser end 28 of the stylus 14 in proximity of the surface of tablet 16. The processor 22 responds to such positioning of the stylus 14 by causing the document being currently displayed on display unit 18 to become the working document 61 as shown in FIG. 2a for the invoked annotation session. As used herein, an annotation session is that period of time between the invocation of the annotator for a particular document and a subsequent cessation of use of the annotator with that document.

The currently displayed document 73 of the working program may be reformatted as illustrated in FIGS. 2c and 2d to provide the working document 61 for the invoked annotation session. If necessary, the processor 22 changes the currently displayed document 73 (FIG. 2c) of a working program from text mode to graphics mode. A character generation program converts text to graphics. Also, the processor 22 changes the currently displayed document 73 (FIG. 2c) from a dark background with light print to a light background with dark print as shown in FIG. 2d to form the working document 61 to be annotated. Thus, the working document 61 (FIG. 2d) which is displayed for the invoked annotation session is driven in a graphics mode and may be a reverse video of the display of the document during the working program.

Figure 2B:
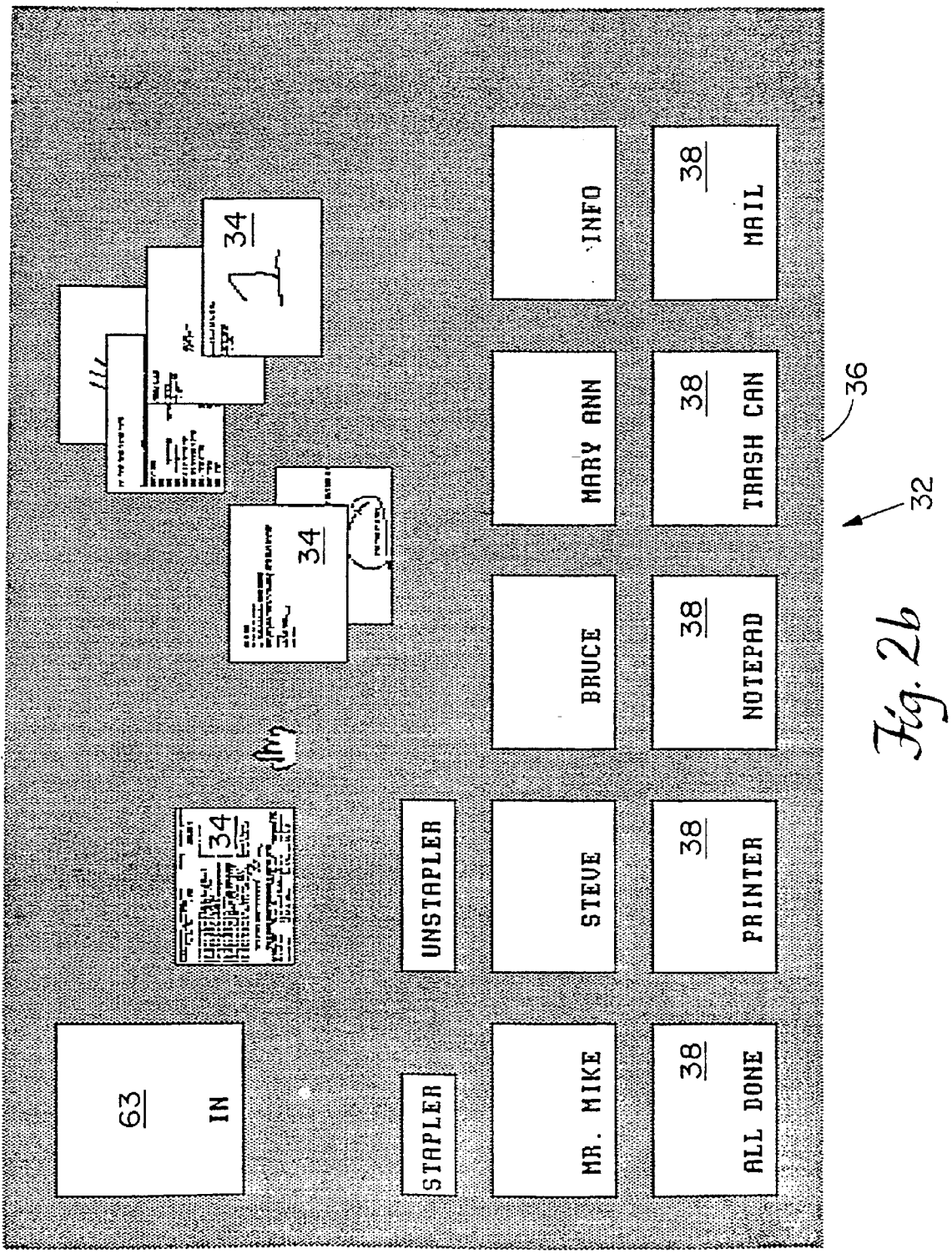
Figure 2C:
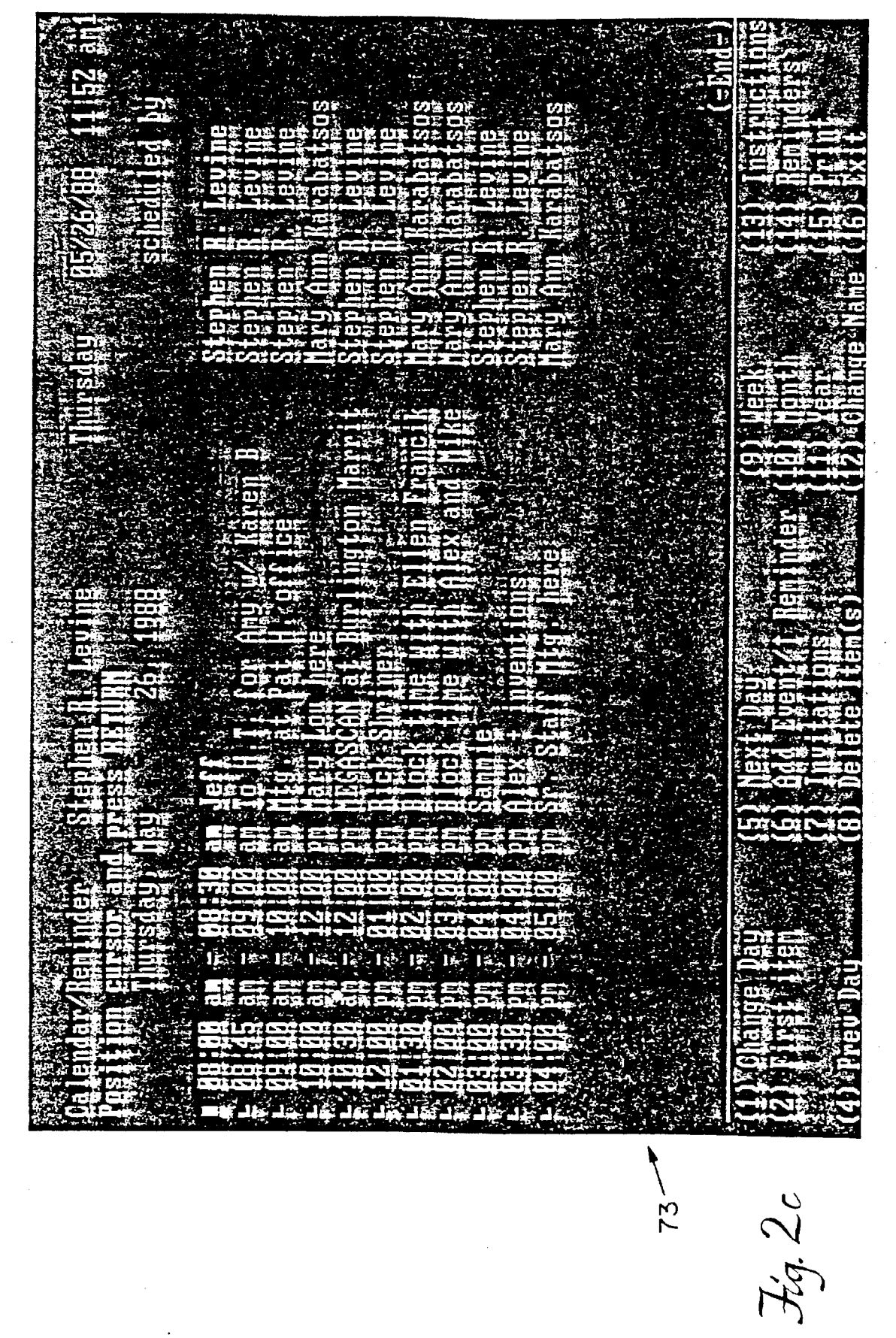

The annotator may also be invoked from the user's system desk which is displayed in a central view of the communication system 20 called the desk view 32 shown in FIG. 2b. The desk view 32 is central to the various tasks and applications of the system 20. In a preferred embodiment, the desk view 32 provides miniaturized images or stamps 34 of various documents which are in the computer work area of the user, that is, which are on the user's system desk 36. The stamps 34 of the documents may be moved around on the system desk 36 by the user operating the writing tip end 30 or the eraser end 28 of stylus 14 in the "touch and move" manner. This involves the user pointing with and placing one end of the stylus 14 on a position on the tablet surface which corresponds to the position of the desired document stamp 34 as displayed in the desk view 32, dragging the stylus end 28, 30 across the surface of the tablet 16 to the desired position on the tablet 16 which corresponds to the desired ending position in the desk view 32, and removing the stylus end 28, 30 from the tablet surface. During the dragging of the stylus end 28, 30 across the tablet surface, the display unit 18 shows the desired document 34 being moved from its initial position to the desired position on the system desk 36 in correspondence with the dragging of the writing tip end 30 across the surface of the tablet 16. When the user lifts the stylus end 28, 30 off the surface of the tablet 16, he stops operation of the stylus in the "touch and move" manner and thus ends the ability to move the document stamp 34 on the system desk 36. By multiple use of the "touch and move" operation, the document stamps 34 may also be stacked in certain desired groups established by the user.

Figure 2H:
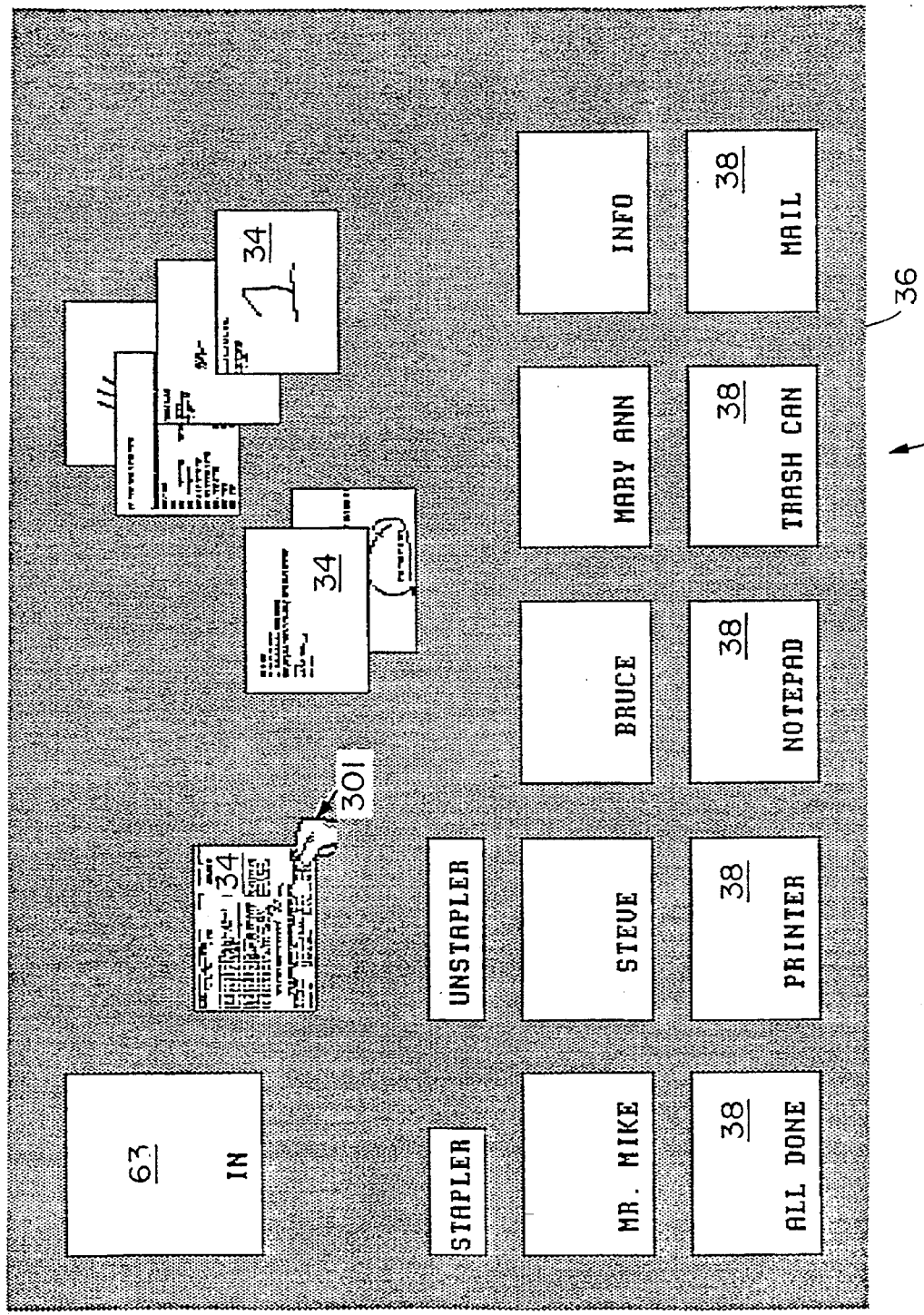
FIG. 2h is another illustration of the desk view with a cursor indicating the repositioning of a document.

Preferably, a cursor 301 depicting a close fisted hand is illuminated adjacent one side of the document stamp 34 being moved as illustrated in FIG. 2h. The close fisted hand cursor and adjacent document stamp 34 move in the same pattern along the system desk 36 as the stylus end 28, 30 moves along the tablet surface.

In addition to the various stamps of documents, the desk view 32 (FIG. 2b) provides indications of various depositories for documents, and various operations of processor 22 that the user can elect to perform from the user's system desk 36. One depository is preferably labelled the "In Box" 63 for receiving all new documents created by the user and any mail sent to the user as shown in FIG. 2b. An icon representing an In Box may be similarly used instead of the labelled depository 63. Other depository areas are labelled with names of other users in communication with the terminal 10 of the user. These named depositories serve as outgoing mail drops for the user to send documents to a particular user.

To send documents to other users who do not have an associated named depository on the user's system desk 36, an electronic mail system is used. An area on the desk 36 labelled "mail" provides the user with the services of the electronic mail system. To select or request such services, the user uses the "touch and move" method of use of the stylus 14 to place the stamp of the document to be mailed on the area labelled "mail" in the desk view 32.

Another labelled area in desk view 32 provides the processor operation for printing a document. Selection of this operation is similar to that of the mail services. Other labelled areas in desk view 32 provide processor operations to provide a new piece of paper (e.g. to create a new document) and to return to a working program. Selection of these operations is by the user "touching and lifting" the writing tip end 30 or eraser end 28 on the corresponding position on the tablet 16.

The various labels corresponding to the different processor operations may be prearranged in a list fashion to form a menu as is known in the art. In the preferred embodiment, the selections are arranged as individual box-like areas 38 or icons movably positioned in a row along one or more sides of the user's system desk 36 instead of in a menu. The box-like areas 38 preferably provide the operation selections of "note pad" to provide a blank new document, "All Done" to return to a working program, "trash can" to dispose of a document, "printer" and "mail" as discussed above. It is understood that other selections may be similarly employed.

A detailed description of the operations of the system desk 36 and the desk view 32 is beyond the scope of the present invention and is left for a related patent application which is assigned to the assignee of the present invention and is to be filed subsequently. Only those parts of the system desk 36 which relate to the annotator are described in detail in the following discussion.

A user invokes the annotator from the desk view 32 in one of two ways. In one way, the user selects a displayed stamp 34 of a document for reading and/or annotating from the system desk 36 (FIG. 2b) by touching and lifting with one end 28, 30 of the stylus 14 on the position on the surface of the tablet 16 which corresponds to the position of the shrunken image of the document in the desk view 32 exhibited on display unit 18. Thereafter, the processor 22 receives the signals sensed by the stylus 14 and tablet 16 and processes the signals to display in full size on display unit 18 the document selected for viewing. During the full screen size display of the selected document illustrated by FIG. 2a, the user may annotate the document 61 with a desired combination of stylus performed (insertions and/or erasures), typed and voiced/audio data.

In the second way of invoking the annotator from the desk view 32 (FIG. 2b), the user "touches and lifts" one end 28, 30 of the stylus on the position on the tablet 16 which corresponds to the pertinent box-like area 38 displayed, for example the "note pad" option in box-like area 38, on one side of the desk view 32 shown in FIG. 2b. The "touching and lifting" on the pertinent selection results in a blank view being displayed to provide the user with a "clean sheet of paper" on which to write. In a similar manner, a selection from the proper box-like area 38 may provide a new ruled sheet of paper or predefined form.

Figure 3A:
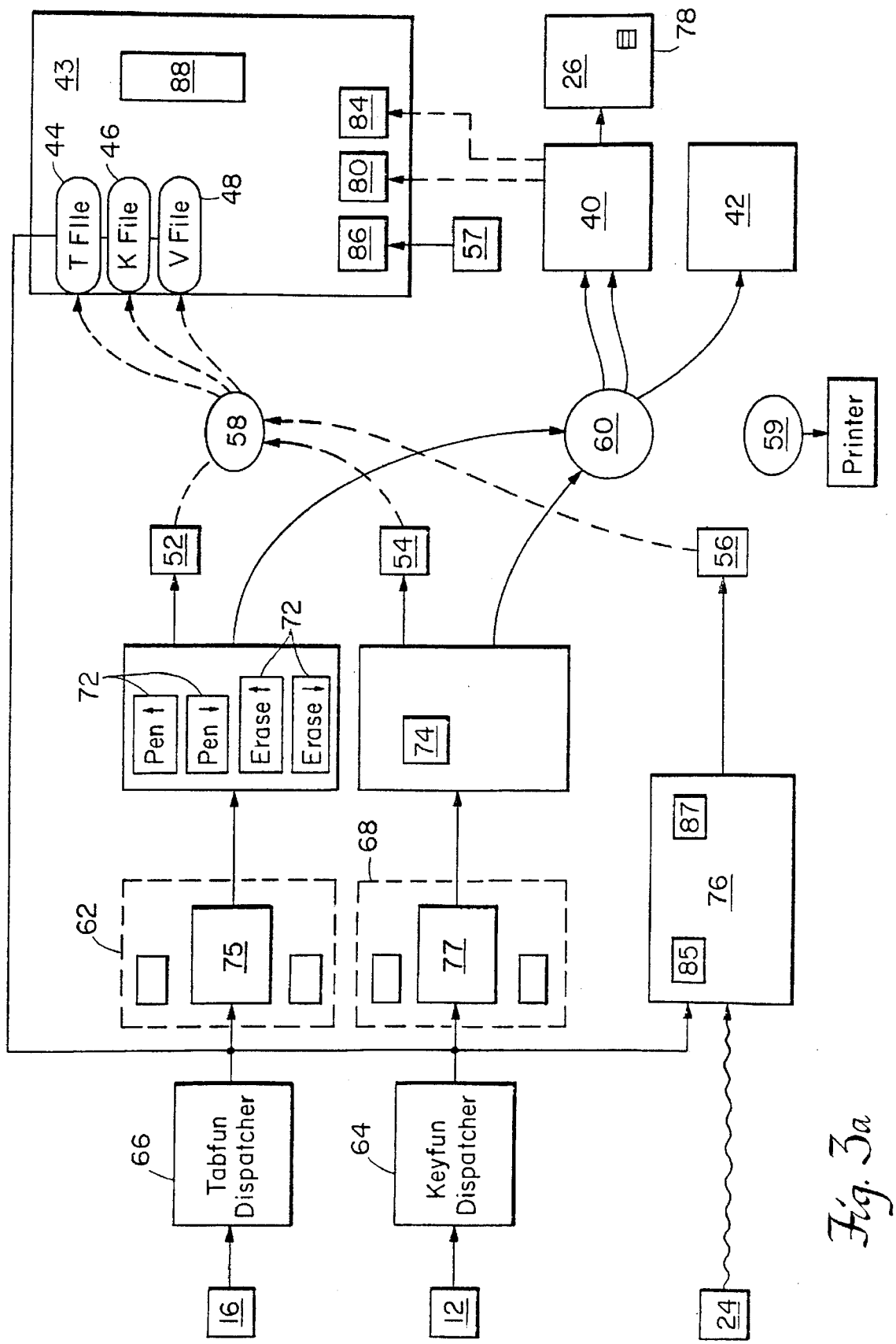

Once invoked, either from a working program (FIG. 2c) or the desk view 32 (FIG. 2b), the annotator operates on the displayed document which is either a blank new document or a document chosen from the system desk 36 or a document from a working program. In the case of a document from a working program, a copy of the document before annotations are made to it is saved in an original screen buffer 57 (FIG. 3a). The copy may be in graphics or text mode, and the copy is used at the end of the annotation session and during replay of annotation sessions of the document described later. In the case of a blank new document, a variable or flag is set to indicate such as the origin of the document instead of saving a copy of a blank page in the original screen buffer. Preferably, the variable or flag indicates whether the new blank page is ruled or plain. Other types of paper could also be indicated.

During the invoked annotation session the processor 22 receives signals from the writing tip end 30 of stylus 14 to provide the writing function of the stylus. While in its writing function, the writing tip end 30 of the stylus 14 is used to insert penned annotations to the displayed document as would normally be done directly to the document with any common pencil. In a similar manner the user erases penned annotations with eraser end 28 of stylus 14 as is normally done with a pencil eraser. As illustrated in FIG. 2a, the cursor 300 depicting a sharpened pencil tip is shown on the displayed document 61 in the position corresponding to the tablet position of the writing tip end 30. Likewise, as shown in FIG. 2e, cursor 280 depicting a pencil eraser is shown in the displayed document 61 in the position corresponding to the tablet position of the eraser end 28. Both cursors 280, 300 provide visual indications relative to the document of the user's actions with the eraser end 28 and writing tip end 30 respectively on the tablet 16.

From the user's perspective, simultaneous with processing of penned annotations from the stylus 14, the processor 22 receives and processes annotations inputted through the keyboard 12 and audio assembly 24. A typing cursor 163 (FIG. 2a) indicates the position on the displayed document where annotations inputted through the keyboard 12 are currently inserted. The typing cursor 163 is preferably an upright rectangular box with dimensions equal to the current font height and width. A horizontal line corresponding to the base line on which the bottom of a character body sits is drawn inside the rectangle.

Typing cursor 163 is able to be freely repositioned by the "touch and move" method of use of either end 28, 30 of the stylus 14. More importantly, the user is able to move the typing cursor 163 to various initial cursor positions on the displayed document 61 and begin insertion of typed annotations at each initial cursor position through the keyboard 12. Each of the inserted typed annotations beginning at an initial cursor position, which is not in the vicinity of previously inserted typed annotations, establishes a local grid of character spaces which is independent of other local grids and independent of any global grid of character spaces over the whole document 62 common in existing text processing devices. Thus unlike existing text or word processors, typed annotation input through keyboard 12 is not constrained to a specific columnar or linear structure for the entire document. Just as the stylus 14 allows the user to freely annotate anywhere on the document 61, annotation through keyboard 12 is flexible enough to allow the user to enter textual input at any position on the document at a given time, establishing only local, as opposed to global, grid structures.

An example of the need for this type of flexibility is in the completing of scanned forms, certain fields of which may be boxed or underlined. In this case the user is then constrained by the document's columnar and linear structure. If the user were using a conventional typewriter, the user would be able to position the document exactly where he so desires by moving the paper scroller perhaps half a line up or down and sliding the document to the left or right, so that the user may enter characters in the correct position on the document form. If the user were using a word or text processor, the document would be associated with a rigid columnar and linear structure known as a global grid that dictates where characters could be placed on the document.

Further, in a word or text processor the textual input is stored as a sequence of related character strings. In the present invention, each text string representing the inserted typed annotations beginning at an initial cursor position is stored in a grid buffer 89, and the beginning character of the text string is referenced in a look-up table 93 illustrated in FIG. 3b and described next. By entering through keyboard 12 a text string beginning at some position (x1, y1) in the screen view 26, the user defines a grid of character spaces that is local only to that text string as illustrated by the dashed lines which form a box around the text string. Information regarding local grids are stored in memory in a two-dimensional singly linked list which forms the look-up table 93. The major axis of the look-up table 93 begins with a header y-node 91 which points to a list of y-nodes, each y-node containing information about y or line positions of new local grids and two pointers. One pointer points to the next y-node entry in the list. Preferably the y-nodes are kept sorted in order of increasing y. The other pointer of the y-node points to at least one x-node associated with that particular y-node, x-nodes referencing the lateral or character space position within a line. Each x-node contains information about starting x or lateral space location of a respective local grid, the extent of the text string in the local grid (i.e. the number of characters that currently define the actual length of the corresponding text string), the number of characters in the text string that are actual valid characters currently displayed to the user in the screen view 26, and an index into the grid buffer 89 which contains the actual input characters themselves. Also contained in each x-node is a pointer to the next x-node in the list of x-nodes under a particular y-node. The x-nodes are kept sorted in order of increasing x.

As mentioned above, the structure in which the actual text strings themselves are stored is a grid buffer 89 of character cells. These character cells are allocated to each local grid only as needed for storing input characters. The information about the current state of the local text strings is kept solely in the x and y node linked list 93. If a local grid needs to be extended beyond its current length, the grid buffer 89 inserts a link at a last possible character position corresponding to the local grid and links some unused portion of the grid buffer 89 to the local grid. Therefore, the local grids can grow dynamically should they need to. After a local grid is defined, the typing cursor 163 will align to the local grid if the typing cursor is in a certain small distance from the extents of the local grid in either x or y direction or both. This occurs during both typing cursor 163 movement and during textural input through the keyboard 12. The sensitivity of the typing cursor alignment is preferably set such that positioning the typing cursor within one character width of the horizontal extent of a local grid in the x dimension or within one character height in the y dimension of a local grid is considered to be within the extent of the local grid. This sensitivity factor may be different in other embodiments of the invention.

An example of the foregoing is illustrated in FIG. 3b. In the screen view 26 the user types the text string "hello world" beginning at the x1 position in line y1. The processor 22 records the characters of the text string in the grid buffer 89 beginning at cell 2 for example. Next, the processor 22 establishes a pointer from the head y-node 91 to a y1 node and a pointer from the y1 node to an x1 node. The x1 node is initialized with the number of current characters in the text string and the number of valid characters in the text string. Also, the beginning grid buffer cell, cell 2, of the text string is referenced in the x1 node. The x1-y1 node defines the local grid of character spaces starting at the x1, y1 position and ending at the (x1+11, y1) position and containing the characters recorded in grid buffer 89 from cell 2 through cell 12. The local grid is illustrated as a dashed line box about the typed annotation "hello world". When the user inserts the word "name" on line y1 beginning at the x2 position in that line, the processor 22 records the characters in the grid buffer 89 beginning at cell 17 for example. Processor 22 then establishes a pointer from the y1 node to a y2 node in the look-up table 93 and establishes a pointer from the y2 node to an x2 node. The x2 node contains the number of the grid cell (i.e. cell 17) at which the newly inserted text string begins in the grid buffer 89 and the number of characters and valid characters in the text string. The x2-y2 node defines the local grid of character spaces beginning at the (x2, y2) position for the text string "name". The dashed line box about the word "name" in screen view 26 illustrates the local grid formed for that newly inputted text string. At the end of the of the list of y nodes a nil terminator is positioned. Similarly at the end of each list of x nodes a nil terminator is positioned.

In a preferred embodiment during an annotation session, a representation of the text of the desired document (or the blank new document) is displayed in the view 26 of display unit 18 by a working-copy bitmap held in a current screen buffer 40 as shown in FIG. 3a. An off-screen bitmap of an initial copy of the document is stored in an erase buffer 42 and serves as a reference copy of the document before annotations are made during a current annotation session. All marks written by the writing tip end 30 of the stylus 14 onto the tablet 16 are reflected on the working-copy bitmap and are subsequently displayed on display unit 18. When the eraser end 28 of stylus 14 is applied to the tablet 16, processor 22 refers to the off-screen bitmap of the initial copy of the document which is held in the erase buffer 42 to determine what bits are needed to restore the erased area to what was originally displayed in the view 26 in the erased area at the beginning of the current annotation session.

The copy of the document in the original screen buffer 57 is not necessarily a bitmap representation and cannot be as efficiently used as a reference copy as the off-screen bitmap held in erase buffer 42. Thus although the state of the document represented by the copy in original screen buffer 57 and that of the copy in erase buffer 42 are the same, the two representations are readily useable for different purposes. Preferably one representation is an optimal form, in handling time and quality, for printing the document, and the other representation is an optimal form, in handling time and quality, for displaying the document on the screen display 18.

In the case of a blank new document being annotated, an off-screen bitmap of the new document is not necessarily stored in the erase buffer 42. Instead, the erased area may be restored by the processor 22 changing the corresponding bits in the working copy bitmap in current screen buffer 40 to reflect a blank area. If the document was a new piece of ruled paper then the corresponding bits in current screen buffer 40 are changed accordingly to provide unmarked ruled areas for the erased areas. The variable or flag which indicates that the document being annotated is from a blank or ruled piece of paper aids the processor 22 in determining for which documents such bit generation is applicable.

It is noted that application of the eraser end 28 only affects the desired portions of penned annotations made during the current annotation session. Penned, typed or audio annotations of prior annotation sessions are not erasable in the current or any succeeding annotation sessions. Currently typed annotations are preferably prevented from being erased by the stylus eraser end 28 in the following manner. All typed text that is within a path of stylus erasure is reconstructed in the screen view 26 in real time. This saves memory space by the typed characters being displayed only in the current screen view 26 and by having no other video page holding character bitmaps to load in during erasure. The processor 22 determines the x-y positions within the erasure path and searches the x-y linked list 93 for those x-y positions to determine the typed characters which are within or intersected by the erasure path. The grid buffer 89 is accessed for the ASCII codes of the affected typed characters, and the characters are quickly rewritten to the screen view 26 during or immediately after erasure by the stylus end 28.

Typed annotations generated in the current annotation session are erasable by keyboard means such as a backspace key or a delete key commonly known in word processing and typing systems. Preferably, the backspace key causes the typing cursor 163 to move one character width to the left, and overwrite (or overstrike) the character currently there, if there is one. If there is no character currently defined there, the backspace is handled simply as a left arrow moving in free screen space. Entering a backspace in the vicinity of a local grid causes the number of valid characters associated with that local grid's x node to be decremented. Recognition of the valid characters during erasure comes into play when the actual bitmap on the screen is erased. By using the information in the x-node of the associated local grid to traverse through the characters of the local grid, the correct ASCII code for the character to be erased can be obtained. A "white" character is then written to the screen view 26 in the corresponding x-y position, hence "erasing" the black character in the screen view. An illustration of white overstriking characters erasing the word "uses" is provided after the typing cursor 163 in FIG. 2e. If all of the characters within the extents of a local grid are erased and the valid character field of the x-node decreases to zero, the x-node entry is removed from the linked list 93. If the x-node was the only one associated with a particular y-node, that y-node is also removed from the look-up table 93. The y line in view 26 corresponding to a removed y-node is "freed" and the typing cursor 163 can float freely over and around that line.

A tablet file 44 of the annotation session records the sequence of the annotations made by the writing tip end 30 and eraser end 28 of the two-ended stylus 14. A keyboard file 46 of the annotation session records the sequence of the annotations made through keyboard 12. The tablet file 44 and keyboard file 46 are referenced in a superfile 88 of the document which catalogues all tablet and keyboard files of all annotation sessions of the document. Further details of the superfile 88 are given later.

As illustrated in FIG. 2a, during each annotation session, a pop-up menu 78 is displayed in view 26 whenever the stylus is sensed to be idle (i.e. not writing, erasing, or making a selection by "touching and lifting"). Preferably, the pop-up menu includes the options of "go to desk", "blank paper", "ruled paper", "erase notes", "playback", "shrink menu", "hide (show) ruler" and "all done". Selection and use of each of these options is discussed below.

The user establishes a typing environment by means of a graphical ruler interface containing margins and tabs. Using the "touch and lift" operation of one end of the stylus 14 to choose the "show ruler" option from the pop-up menu 78 causes a ruler to be displayed along the top of the document 61. On the ruler are left and right margin icons, denoted preferably by black downward pointing triangles that look like the letter V. The default position for each margin is one inch from either edge of the document 61. Using the "touch and move" operation of the stylus 14, the user moves the margins freely in the horizontal direction to any location on the document within ¼" from the edge of the document. The typing cursor 163 is always located somewhere between the two margins as they define the allowed "typing area". For example, moving the typing cursor 163 near the left hand edge of the document 61, and then moving the left hand margin to the middle of the screen view 26 causes processor 22 to move typing cursor 163 inwards so that it is never outside of the allowed typing area defined by the margins.

Tab icons are preferably denoted as right pointing black triangles. The tab icons preferably are sliding icons on a ¼" wide white strip beneath the ruler. At the left end of the white tab strip is a box from which new tabs are taken and to which old tabs are returned using the "touch and move" operation of one end of the stylus 14. The user establishes a tab by touching a tab icon in the tab box with an end of stylus 14, moving the tab icon to a desired tab stop location with the stylus end, and lifting up the stylus end to cease operation of the "touch and move" function. Tabs are dynamic entities, hence currently defined tabs can have their icons touched and moved anywhere on the tab strip. Each tab icon must be placed in its own "discrete" position, positioning a new tab icon too close to a tab icon of a previously defined tab will cause the newest tab icon to be erased from the screen view 26 and returned to the tab box to be used again.

As stated previously the user is able to type characters at any time within the area dictated by the margins. The current position of the typing cursor 163 is the position at which the next typewritten character is written to the document 61. After the character has been input, the typing cursor 163 is moved one font width to the right. Should the typing cursor 163 move to within the vicinity of the right margin, the typing cursor will auto wrap to the left margin position on the next line. If there is any previously entered text there, the typing cursor will automatically align with a character space of the local grid established by the previously entered text. If the typing cursor 163 comes into the vicinity of the right margin in the middle of a word, the entire word is automatically wrapped to the next line.

By touching and lifting one end 28, 30 of the stylus 14 on the position on the tablet 16 corresponding to the "playback" option in pop-up menu 78, the user selects that option. Selection of the "playback" option during an annotation session of a document provides a replay of each form of the document from its origination through each annotation session up through and including the present annotation session. More importantly, the replay provides a relative time sequence of the annotations made to the document in all annotation sessions of the document. In one embodiment, the user may request playback of the annotation sessions in a desired order and at an increased pace than the pace in which the annotations were originally input. In particular, the "playback" option of the pop-up menu 78 may provide "fast forward" and "rewind" options similar in use and effect to "fast forward" and "rewind" options of commonly known recording devices. At the end of the replay, the document and processor 22 are ready to continue the annotation session.

A new annotation session may be started from a current annotation session with the selection of the pop-up menu 78 options for changing the type of paper currently being annotated to blank or ruled paper. The user selects the "blank paper" or "ruled paper" option by using the "touch and lift" manner of operation of one end 28, 30 of the stylus 14 on the corresponding position on tablet 16. The processor 22 provides the selected type of paper by generating the corresponding screen view and accordingly initializing the current screen buffer 40 and erase buffer 42 with original contents for the new annotation session. The processor 22 saves the document which was being displayed at the time the "blank" or "ruled" paper option was chosen and saves any annotations made to it during that annotation session. Accordingly, processor 22 replaces an updated stamp of the document for the last stamp of that document on the user's system desk.

The selection of the "erase notes" option in the pop-up menu 78 provides a new start of the current annotation session. The processor 22 discards all the erasures and additions made prior to the user "touching and lifting" the writing tip end 30 or eraser end 28 on the corresponding position on tablet 16 to select the "erase notes" option. That is, the processor 22 clears the working bitmap in current screen buffer 40 and the tablet file 44 of all the annotations made thus far in the annotation session and refreshes the screen view 26. As a result, the document currently being annotated is displayed without any of the annotations made to it thus far in the current session.

In accordance with the foregoing, the user is able to begin a first annotation session with a first document, say for example from the system desk 36, annotate the first document, and select the "ruled (blank) paper" option to create a new document in a second annotation session by annotating the new piece of ruled (blank) paper. Upon the user selecting the ruled (blank) paper option, the processor 22 updates the stamp of the first document on the user's system desk 36 to include the annotations made in the first annotation session which were not discarded by a selection of the "erase notes" option. At the end of the second annotation session, processor 22 creates and places a stamp of the new document in the In Box 63 on the system desk 36.

The same or similar results would occur whether the first document is from the interruption of a working program, a stamp on the system desk 36, or the selection of the "note pad" option in the desk view 32. Selection of the "note pad" option or interruption of a working program to obtain the first document in the above scenario causes a stamp to be formed to represent the newly created document with its annotations from the annotation session. The stamp of the new document is placed in the In Box 63 on the system desk 36 and remains there until the user returns to the desk view 32 and removes the stamp from In Box 63.

A current annotation session may also be ended by the user selecting a pertinent option from the pop-up menu 78 displayed in view 26 during the annotation session. The pertinent options of pop-up menu 78 in the preferred embodiment are: "go to desk" and "all done". By using the "touch and lift" manner of operation of one end 28, 30 of the stylus 14 on the position on the tablet 16 which corresponds to the position of the selection to return to the system desk 36 (i.e. the "go to desk" option), the user ends the current annotation session and enters the desk view 32. Similarly by the user "touching and lifting" stylus end 28, 30 on the position on tablet 16 corresponding to the position in view 26 of the "all done" option, the user ends the annotation session and reenters the working program at the point where the annotator was invoked.

Upon returning to the desk view 32 (FIG. 2g) or the working program, a "stamp" which is a shrunken image or miniaturization of the annotated document at the end of the annotation session is added to the system desk 36, in the case of a blank or ruled paper or a new document from a working program having been annotated. In the case of a previously annotated document having been annotated in the annotation session, an updated stamp replaces a previous stamp of the document on the desk 36. In a preferred embodiment, the stamps of annotated documents are processed in the order in which the documents were annotated. Hence, a stamp of the document last viewed or last annotated in the last annotation session is generated last. New stamps, that is, stamps of the new documents are placed in the In Box 63 (FIG. 2g) with the first generated new stamp on the bottom of the In Box and the last generated new stamp at the top of the In Box 63. Although a first-in, last-out ordering of the stamps in the In Box is described, other orderings of the stamps are suitable and can be specified by the user.

Production of a stamp on the user's system desk is accomplished by a stamp file 80 (FIG. 3a) of the document which holds in a compressed form a currently updated image of the document as affected by the last annotation session. The stamp file 80 is generated from the working copy bitmap in current screen buffer 40 at the end of each annotation session and is stored in disk memory 43 outside of local memory where the annotator operates.

Also placed in disk memory 43 at the end of each annotation session is a snapshot of the last view of the annotated document displayed on the monitor screen. The bitmap of this last view is formed from the working bitmap in current screen buffer 40 and is held in an intermediate file 84 (FIG. 3a) which is used for everything but playback of annotations or printing of the document as finally affected by the annotation session. Hence, the intermediate file 84 contains the most current representation of the document with its annotations from all annotation sessions. In the interest of memory space, the image data from the working bitmap of current screen buffer 40 is compressed to form the contents of intermediate file 84.

At the end of the first annotation session of a new document formed from a working program, the contents of the original screen buffer 57 is copied to an original screen file 86 in disk memory 43 as shown in FIG. 3a. Original screen file 86 enables replay or playback of the document as described next.

Playback of the annotation sessions of a document may be invoked from the desk view 32 (FIG. 2b). The user "touches and lifts" stylus end 28, 30 on the position on the tablet 16 which corresponds to the position of the stamp (shrunken image) of the document 34 in the desk view 32. The document 34 (FIG. 2b) is then displayed in full screen size in view 26 of the display unit 18 from an original form through a chronological sequence of annotations made to it during all the past annotation sessions of that document up to that time. The original form of the document is stored in original screen file 86 in disk memory 43 as mentioned above and shown in FIG. 3a. The contents of the original screen file 86 is either a scanned image, or a text mode or graphics mode image of the document as stored in original screen buffer 57 at the first time the annotator was invoked for that document as described previously. The original screen file 86 during playback provides the background of the display, and the tablet and keyboard files 44, 46 provide the sequence of annotations made to the document. In the case of a document which originates as a blank or ruled page, no original screen file is saved for that document since nothing is stored in the original screen buffer. Only the indication of the document originating as a blank or ruled page is saved, and on playback the processor 22 responds to the indication by generating a corresponding blank or ruled page for the background of the display.

A document may also be longer than the display screen and/or have several pages. In one embodiment, scrolling from top to bottom of a single page or sequentially from one page to succeeding or preceding pages is enabled by means known in the art. Preferably when either end of stylus 14 is positioned near the area on the tablet 16 which corresponds to the edge of the document being annotated, a cursor 100 depicting a close-fisted hand is displayed at the respective position at the edge of the document as shown in FIG. 2f. The close-fisted cursor 100 appears to scroll a page of the document or a multipage document itself from one page to another, line by line, at a rate and in a manner dictated by the user's "touching and moving" the stylus along the corresponding tablet area.

In another embodiment, each page is treated in a separate annotation session in a manner as described above. Each page has its own original screen file or ruled/blank page indication which provides a text mode or graphics mode image or processor generated image, respectively, of the page from the first time the annotator was invoked for that page. The original screen file or indication of each page also provides the background of the display of the corresponding page during replay of an annotation session as described above. Each page also has its own intermediate file containing a bit map of the last screen of an annotation session of the page as described above. The intermediate files corresponding to the pages of a document enable the processor 22 to quickly flip through the pages of a document.

On the other hand, no matter how many pages a document has, the document only has one stamp file 80 and one superfile 88 (FIG. 3a). The image of the page which was annotated in the last invoked annotation session of the document is compressed to form the contents of the stamp file 80. After each annotation session, the stamp file 80 is updated according to the page of the document that was last annotated during that session. Alternatively, a stamp and thus a stamp file 80 for each page of a document may be used. The superfile 88 serves as a directory of all files of the document. In the preferred embodiment, the stamp file 80 and the superfile 88 of the same document both share a common base name. The stamp file adds the suffix ".wst" for example and the superfile 88 adds the suffix ".wsf". The processor 22 refers to a document by the base name of its superfile/stamp file, and reference to the other files of the document are made by the base name in combination with appropriate suffixes.

For simplicity, reference is made to the document as a whole throughout the following discussion, but it is understood that each page of the document may be treated in the manner described for the document. Also, as used herein the term "document" refers to a still display of one or more images or one or more single screens of information and is not meant to be confused with a sequence in time of frames of images which form an animated picture. Hence, a "displayed document" refers to an image representation of a document which is viewable on a computer display screen. Further, a replay of the annotation of a document is a replay of the creation of a definable composite image as opposed to a replay of a sequence of created images in the case of animation.

In addition to visual (i.e. hand-written, erased and typed) annotations, audible or audio annotations may also be made to the document, or any page thereof, during an annotation session. Instead of annotating the document with the two ends 28, 30 of the stylus 14 and/or with the keyboard 12, the user may voice a message or otherwise generate a sound-made message during the annotation session into an audio assembly 24 shown in FIG. 1a or other receiver/speaker unit connected to the digital processor 22. Like the tablet file 44 and keyboard file 46 of FIG. 3a, a voice file 48 records the voiced/sounded annotations generated during an annotation session. Each voice file 48 of a document is catalogued in the superfile 88 of that document. During playback, handwritten, erased, typed and voiced annotations are displayed/sounded in a manner in time sequence which mimics the way those annotations were originally made to the document.

Alternatively, the handwritten/erased and typed annotations alone may be played back in time sequence order at an increased rate. At the end of the display of the quickened sequence of handwritten, erased and typed annotations, a system message is displayed on display unit 18 to inform the user that voiced/audible annotations exist for this document and are able to be heard over the output port of the audio assembly 24 in proper time sequence that the voiced annotations were originally dictated.

The superfile 88 of each document is organized as a table of contents which is at any time appendable. Each entry in the table of contents references one annotation session of that document and lists the types of files created during that annotation session. Hence, the superfile 88 provides a history of all annotations sessions of a document.

In a preferred embodiment as illustrated in FIG. 4, a superfile 88 of a document has a header record 90 and one or more session records 92. The header record 90 contains information which is general to the document such as the number of pages and last accessed page of the document. Every time a user completes an annotation session, a session record 92 is created and keeps track of pertinent information for that annotation session. The session record 92 is then appended to the end of the superfile 88 for the document. Each annotation session is named and the annotation session name is stored in the session name field 96 of the respective session record 92. The paper field 94 of a session record 92 denotes the presence of an original screen file 86. Certain codes in the paper field 94 indicate the use of a program generated screen (e.g. blank or ruled paper) and other codes indicate a particular screen file 86 containing screen information as previously described for the page of the document indicated in the page field 98. Preferably, references to original screen files 86 use the suffix ".wsc" after the name of the session in which the respective page was found. A code in the paper field 94 may also indicate that the document page annotated in the annotation session corresponding to the session record previously existed and is appended to during the session. The status field 99 has bits to mark the presence of tablet (T), keyboard (K) and voice (V) files and to mark the existence of erasures (E) in an annotation session. Each of the tablet, keyboard and voice files have names that consist of the name of the session in the session name field 96 plus a unique suffix. Each session record 92 also has a field for indicating date and time of creation of the record 92. Since the session records 92 are time sequenced, the processor 22 can start with the superfile basename of a document and use the session names and suffixes to recreate the document exactly as the user had created it.

Each tablet file 44 holds information necessary to recreate a user's interaction with the tablet 16 during an annotation session. Included in the information are x and y coordinates of the writing tip end 30 or eraser end 28 of the stylus 14 on the tablet 16 and the relative timing of occurrence of different pairs of x and y coordinates. Each pair of x and y coordinates is recorded in sequence along with timemarks as needed to provide a time sequence of handwritten annotations and erasures made by the user during an annotation session. Since the eraser end 28 of stylus 14 is effectively wider ended than the writing tip end 30, the x-y coordinates of strokes of the eraser end 28 are recorded in a manner which indicate wider bands or strokes than handwritten annotations. Pressure and z-axis measurements corresponding to the pairs of x and y coordinates are used to determine changes in stylus end being used (i.e. from eraser end 28 to writing tip end 30 and vice versa) and may also be recorded in the tablet file. Each change in stylus end is associated with a delimiter to provide an indication of the stylus end to which the x-y coordinates correspond. Preferably, a timemark of the change in stylus end is also associated with the delimiter.

An illustration of a tablet file 44 in the preferred embodiment is shown in FIG. 5. The tablet file 44 has a header record 13 which contains tablet file and annotation session identification information and information describing interpacket timings of the packets of data transmitted from the tablet 16 to the processor 22. The tablet file identification uses the suffix ".wtb". The rest of the tablet file 44 contains the x and y coordinate portions of the packets of data separated by delimiters 11. The delimiters 11 mark major changes such as the switching from writing tip end 30 to erasure end 28 or from one end being on the tablet 16 to being off the tablet 16, or vice versa. A code field 15 of each delimiter 11 provides an indication of one of the following:

stylus end down (i.e. beginning of a stroke)

stylus end up (i.e. ending of a stroke)
switch to erasure end 28
switch to writing tip end 30.

A pressure field 17 of the delimiter 11 provides an indication of sensed pressure of the end of the stylus 14 corresponding to the code field 15. Time field 19 of delimiter 11 provides an indication of the time at which the action of the code field 15 occurred. The timing of x, y data after a delimiter is defined by the interpacket timings specified in the header record 13. The processor 22 is able to use the information of the header record 13, delimiters 11 and data of the tablet file 44 to exactly replicate the user's action on the tablet 16 from an annotation session.

In a similar fashion, the keyboard file 46 records a sequence of ASCII characters and timemarks which provide time-based indications of the typed annotations. In the preferred embodiment illustrated in FIG. 6, keyboard interaction is not sampled on a predetermined schedule, therefore each keystroke is timed. Two timings are used. In the short timing where the user types fast enough that keystrokes are separated by less than about half minute intervals, each keystroke is packaged with a 15-bit (32,767 millisecond) interstroke time 29. In the long timing where the interstroke time is longer than about 30 sec., a 32-bit time of occurrence is recorded. The two timings are used to save disk space. The keyboard file 46 has a header record 21 which provides identification information about the file. References to keyboard files use the suffix ".wkb". In addition, keyboard files 46 created by the annotator contain a special code to save on recording space. When the user asks to show or hide the "ruler" (via pop-up menu 78) used to define typing, margins and tabs, a special keystroke is added to the keyboard file 46.

Printing of the document and annotations thereto is accomplished in the time sequence which the annotations were originally input by the user and not by order of position of characters on the document. At print time of a document, for each page, the sequences of data of the tablet and keyboard files 44, 46 of a page are merged with the latest bitmap, preferably from the original screen file 86 of the page, to format the document in its most up-to-date version. The resulting bitmap is used by a printer to generate the document in printed paper form.

Anti-Skip Routine

The end of the stylus 14 which is in proximity of the tablet generates a voltage difference relative to the tablet 16. The voltage difference is inversely proportional to the square of the distance between the stylus end and a sensing surface within tablet 16. As the stylus end is drawn closer to the tablet surface along an axis (the z-axis) perpendicular to the surface, more finely discriminable data points of the z coordinate are collected. Those data points are used in combination with a sensed amount of pressure to define stylus end contact with the tablet surface. By the same token, z-axis data points and pressure measurements together are employed in a subroutine to prevent false stylus-up signals, during writing and erasing with the stylus, due to human performance and mechanical and hardware imperfections.

In the preferred embodiment, when the rate of decreasing distance between a stylus end and the tablet surface, along the z-axis, reaches zero and the sensed amount of pressure greatly increases, the corresponding stylus end is considered to have made contact with the tablet surface. In addition, the sensed pressure of an end of the stylus 14 controls the initiation and reinitiation of that end as long as the end is within a certain distance of the tablet surface along the z-axis. When the pressure of an operating stylus end decreases below a predetermined threshold but the end is sensed to be within the predefined tolerance or range of acceptable distances along the z-axis, the anti-skip subroutine generates signals to the processor 22 to indicate that the stylus 14 is still intended to be used in the writing/erasing manner of operation. When an acceleration in the change in distance away from the tablet along the z-axis is sensed along with a decrease in pressure below the predetermined threshold, the anti-skip subroutine generates signals to the processor 22 to indicate that the stylus end is effectively off the surface and that use of the stylus 14 for writing or erasing a current stroke has ended. Moreover, if the distance of the operating end of the stylus is sensed to be outside of the predefined z-axis threshold for a certain length of time then the anti-skip routine generates signals to the processor 22 to indicate that the stylus end is off the tablet surface for operational purposes of the stylus. Hence upon future reentrance of a stylus end into proximity of the tablet, the stylus end will need to be reinitiated and driven accordingly.

Because the tablet 16 may not be perfectly smooth over its entire top surface, the z-axis value may vary from point to point on the tablet 16 and position-dependent corrections may be necessary. Thus in a preferred embodiment, a relative measurement of distance between an end of the stylus 14 and the tablet 16 along the z-axis is used for each point on the tablet.

Software for Annotator

The features of system 20 described above are provided by an Annotator-Desk task program also referenced with the reference numeral 20 since the Annotator-Desk task is the software counterpart to the hardware elements of system 20 shown in FIG. 1a. The annotator itself is driven by an annotator application routine which is one of several application routines in the Annotator-Desk task. Other application routines are for driving the desk application which involves the desk view 32 and corresponding functions therewith, or for driving the print application for printing documents.

Figure 7:
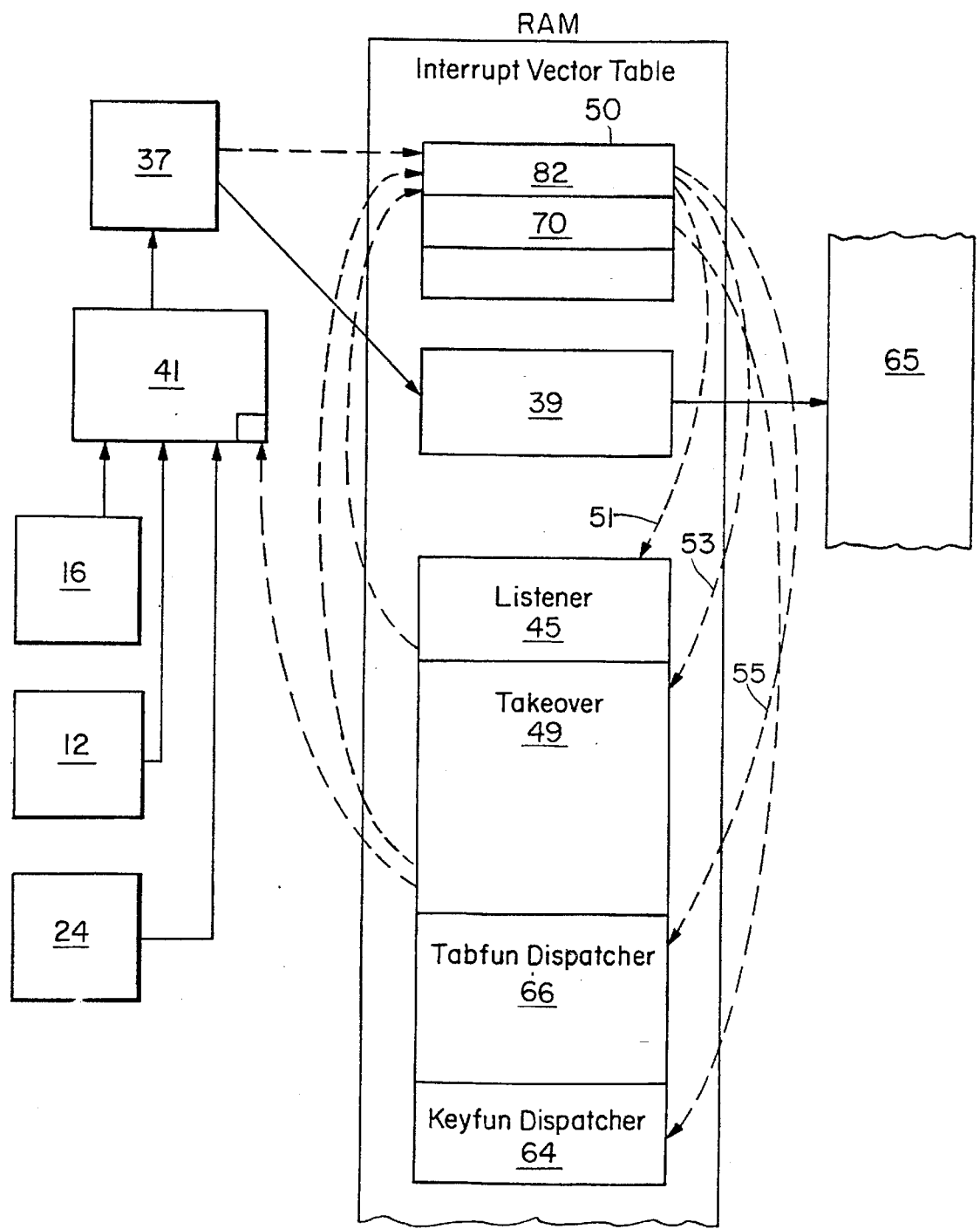
FIG. 7 is a schematic of control of the operating system in the system of FIG. 1a during an annotation interrupt.

In general, the Annotator-Desk task may be thought of as an interrupt program. As illustrated in FIG. 7, the operating system 37 of processor 22 may be running a first program 39 at the time the annotator is invoked. At that time, the signals transmitted from the tablet 16 are received by an interrupt controller 41 which in turn asks the operating system 37 to temporarily stop the running of the first program 39 long enough for the annotator application routine of the Annotator-Desk task (and any of the other application routines desired) to be run and then to resume running the first program 39. The stopping of the first program 39 is accomplished by a subroutine called the Listener which passes control to a second subroutine called the Takeover, both of which will be discussed later. The actual running of the annotator application routine is accomplished by a series of interrupts to the operating system 37 by subroutines which drive the tablet 16, keyboard 12 and audio assembly 24 of the system 20.

Figure 8:
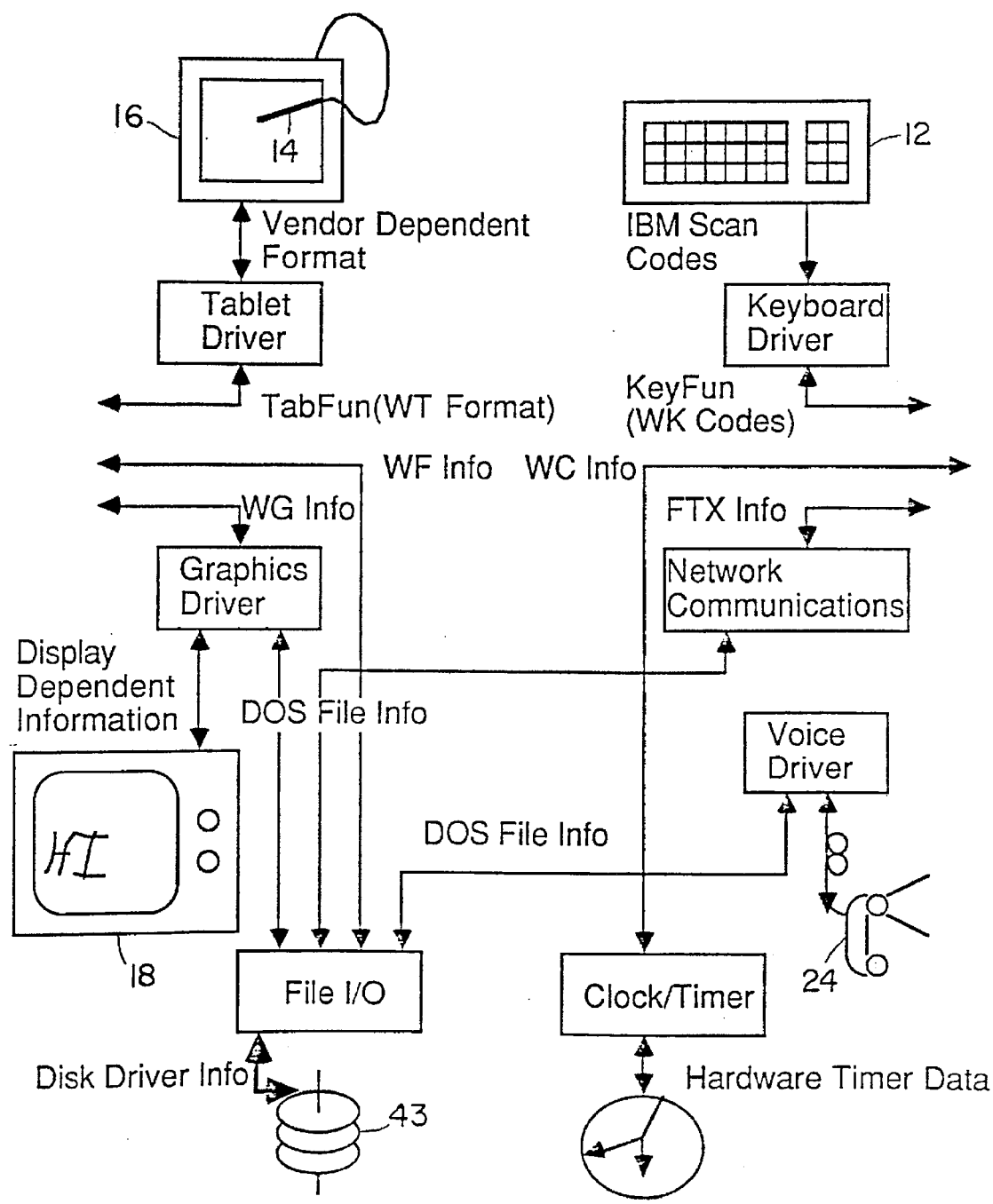
Figure 8:
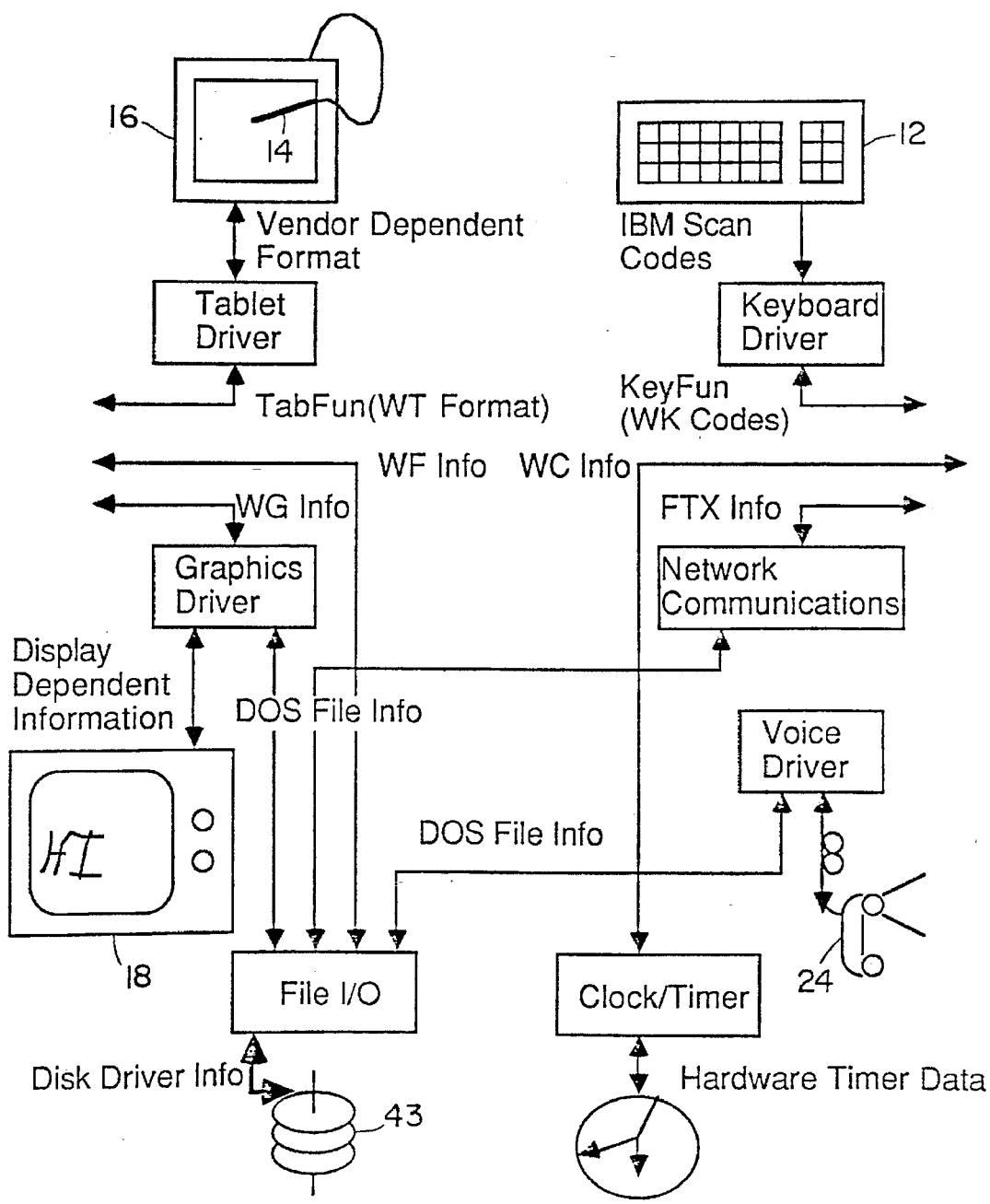

The foundation of the foregoing subroutines consists of a set of six device drivers or modules shown in FIG. 8 and labelled Graphics driver, Tablet driver, Keyboard driver, Network Communications, File I/O driver and Clock/Timer. The device drivers are typical, that is they abstract details of an associated device, such as tablet 16, keyboard 12, display unit 18 etc., from the applications that use them and communicate through a set of standard requests and data formats. The Clock/Timer is one of the most basic drivers. It provides the Annotator-Desk task 20 with a 1 KHz counter used to time annotations and synchronize graphical feedback. The File I/O driver allows applications to create, open, read, write, delete and rename files.

The Graphics module provides an application with a virtual sheet of paper. There are commands to write on this paper, erase on this paper, display a particular kind of paper, save and load this information to disk 43 and manipulate cursors and buffer portions of the view on screen display 18. The Graphics module also provides the desk view which is used exclusively by the desk application. The stamp and cursor display and manipulation functions of the desk application are also handled by the Graphics module.

The Network Communications module provides a data path to computers of the network used for mail, remote printing or other network shared tasks. The Network Communications module allows an application to send and receive a file, determine the presence of certain files used for mail, and conditionally delete files.

The Tablet module is one of two interrupt-based device drivers. Upon the operating system 37 receiving an interrupt indicating the availability of data points from the tablet 16, the Tablet driver packages the information into a data packet of a standard format and calls a tablet function. A tablet function is a procedure that controls exactly what is done upon receipt of the data packet. A tablet function can accomplish various steps on the system desk as well as during annotation and can make requests of the Graphics module, the Timer module, and/or call other procedures. In the preferred embodiment, the tablet functions generally have the following format:

```
Procedure myTabFun( );
begin
    GetDataFromTablet;
    <do whatever work is necessary>
    if (condition 1)
        prepare for transition
        TabFun(newTabFun1);
    else if (condition2)
        <prepare for this transition>
        TabFun(newTabFun2);
    .
    .
    .
    else
        <non-transition work>
end
```

In the IF statements, the tablet function is deciding which tablet function should be called when the next data packet is received. Thus, if condition 1 is achieved, myTabFun performs whatever tasks are needed for the proper execution of newTabFun1 and then tells the Tablet driver to execute newTabFun1 by calling the procedure TabFun. This does not cause immediate execution of newTabFun1. Instead, upon finishing myTabFun, the Tablet driver allows receipt of another data packet. Only when this subsequent packet is received is newTabFun1 called. If a succeeding tablet function is not declared during execution of a current tablet function, the current tablet function will be called upon receipt of the next data packet.

The tablet functions provide a state machine approach to handling the tablet. From an initial state (from a call to a tablet function) the Tablet module simply performs work and shifts states depending on the data at hand. Since interrupts are performed to completion at a priority higher than the main level of the annotator application routine, the Tablet driver allows the operating system 37 to pseudo-multitask (i.e. process a series of interrupt tasks).

The Tablet driver makes the data packet available in a data format called WT_Data. This format includes a package of four 16-bit words. One 16-bit word represents an x coordinate (i.e. the x position of the stylus 14 on tablet 16), at 1000 dpi. A second 16-bit word represents a y coordinate (i.e. the y position) at 1000 dpi. One byte (8 bits) of another word represents a z coordinate; another single byte (8 bits) represents pressure on the end of the stylus 14. One more byte (8 bits) represents which end of the stylus is being sensed. The positions for x and y are based upon a sheet of paper with the origin preferably at the lower left corner of tablet 16. Since Annotator-Desk task 20 allows the user to move off the sheet of paper in all directions, negative numbers and numbers larger than the dimensions of the paper are valid.

The Keyboard driver is the other interrupt driver in the Annotator-Desk task 20. It takes an IBM scan code and maps it into a modified ASCII format used by the task 20. The ASCII format of Annotator-Desk task 20 consists of the character set published in IBM's technical reference with the following changes:

characters Hex13-17 are used for Left Arrow, Right Arrow, Up Arrow and Down Arrow; and characters HexB0-FF are used for Function Keys and HELP and CANCEL keys.

Just like the Tablet module, the Keyboard module calls a key function upon receipt of a keystroke. The current key function procedure is used to change the key function called upon receipt of the next keystroke. The default key function emulates the keyboard handler used by MS-DOS. The Keyboard module's mapping tables are totally reconfigurable. The actual ASCII data output from a given keystroke can be changed by re-writing the 2 KiloByte mapping table. An application can even remove the arrow and function mappings. The flexibility of the mapping tables provide the ability to handle a variety of alphabets and usages, such as international needs.

In the preferred embodiment, a main working portion of the Tablet driver is referred to as a tablet function (tabfun) dispatcher 66, and a main working portion of the Keyboard driver is called the keyfun dispatcher 64.

As mentioned earlier, the Listener subroutine stops the running of the first program 39 in order for the annotator application routine to be run. Before doing so, the Listener must determine whether the user is indeed invoking the annotator. In making this determination, the Listener assumes that it takes the user more than 25 milliseconds to pick up the stylus 14 and place one of the ends of the stylus within proximity on the tablet 16 in a ready-to-annotate position. The Listener watches for data packets delivered from the Tablet module on a schedule of about every 25 msecs. The Listener runs intermittently with the first program 39 without that program's knowledge and uses the interrupt and pseudo-multitasking capabilities of the Tablet module to examine what the user is doing with tablet 16 and stylus 14, if anything.

More specifically, each time the Tablet module collects and formats data points from the tablet 16, the interrupt controller 41 interrupts the operating system 37 running first program 39 and tells the operating system 37 to run the program referenced by the pointer 82 corresponding to the tablet 16 in the interrupt vector table 50, which at this moment is the Listener subroutine 45 illustrated by a dashed line 51 in FIG. 7. During the first of such interruptions, the data packet formed by the Tablet module is received and tested by the Listener for timeliness with respect to the 25 millisec schedule as shown in FIG. 9. As long as the stylus 14 lies on the tablet 16, the packets of data are sent and received "on schedule" indicating the x, y, z, pressure and which-tip-end coordinates relative to the position of the stylus 14 on the tablet 16. When the stylus 14 is lifted by the user's hand out of sensing range of the tablet (about 10 mm to about 20 mm), no signals are transmitted from the tablet 16 to the Tablet module. In turn, there is a break in the schedule of data packets received by the Listener subroutine. From the break in schedule, the Listener determines that there is now an "off schedule" situation and that the stylus 14 has been moved out of proximity of the tablet 16. A count of time during which the stylus 14 remains "off schedule" is begun. When the stylus 14 is initially off the tablet 16, then the absence of data packets being sent by the tablet module is initially interpreted by the Listener subroutine as an "off schedule" situation and a count of time is immediately started.

During the interruption where the data packet is determined to be off schedule, the Listener returns control of the operating system 37 to resume running the first program 39 and waits for a data packet which is on schedule. When the user places the stylus 14 in writing or erasing position back into proximity of the tablet 16, causing an interrupt, the Tablet module collects and formats the data points into a data packet which is sent to the Listener during a subsequent interrupt. In the case where the stylus 14 was initially on the tablet 16 and moved off the tablet, the Listener in accordance with the 25 millisecond assumption compares 25 milliseconds to the amount of time that has lapsed between the last on-schedule data packet and the current on-schedule data packet as counted during the "off-schedule" period to determine whether the user is ready to write/erase and the stylus 14 is to be turned on. In the case where the stylus 14 began in a position outside of the sensing range of tablet 16, the counted time is compared with 25 milliseconds. If the amount of time that has lapsed or the counted time is greater than 25 milliseconds then the Listener changes the interrupt vector table pointer 82 which corresponds to tablet 16 to point to the Takeover Subroutine 45 as indicated by dashed line 53 in FIG. 7.

During the initial interruptions in which the data packet is "on schedule" the Listener tests the pressure and z-axis coordinates to determine which end the user is holding in proximity of the tablet 16 and whether the user is ready to use that end. The z-axis coordinate is checked to determine whether the stylus end is within the predetermined proximity of the tablet surface. If the measured pressure of the sensed stylus end is greater than a predetermined minimum pressure level, then the Listener decides that the user is trying to write or erase with the stylus 14. In such a case, no data packet is found to have been off schedule for longer than 25 milliseconds thus the user picked up the stylus 14 without removing it from the sensing range of tablet 16. The Listener changes the interrupt vector table pointer 82, which corresponds with the tablet 16, to point to the Takeover subroutine 49 as indicated by the dashed line 53 shown in FIG. 7.

The sensing of pressure in combination with the 25 millisecond off-schedule timing and on-schedule proximity to tablet 16 is used by the Listener subroutine 45 to determine whether the user is ready to act with the stylus 14. The z-axis (altitude above the tablet 16) is sensed so that the Listener subroutine 45 can anticipate the illumination of a view on the screen display by the time that it is determined that the user is ready to act with the stylus 14. That is, the Listener subroutine 45 senses the z coordinate to anticipate the stylus 14 being placed in ready position so that the Listener subroutine 45 may exhibit a view on display unit 18 at the earliest possible moment to signify to the user that the annotator is invoked.

A pressure measurement alone is not sufficient to test the readiness of the user because the user may be causing pressure at one end of the stylus 14 without holding the stylus in a ready position on the tablet 16 and without placing pressure on the tablet 16 with one end of the stylus 14. Also the combined use of the z and pressure coordinates substitutes for the pen tip switch used in prior known electronic pens.

Once it is decided that the user is ready to annotate and that one end of the stylus 14 is on or in proximity of the tablet 16 then the Takeover subroutine 49 is executed. To accomplish this, the first program 39 being currently run by operating system 37 is subsequently interrupted by the Tablet module responding to input data from tablet 16. The interrupt controller 41 asks operating system 37 to run the program to which the corresponding pointer 82 in the interrupt vector table 50 points. At this moment the pointer 82 points to the Takeover subroutine 49. The operating system 37 thus temporarily stops running first program 39 and executes the Takeover subroutine 49.

An overview of the Takeover subroutine 49 is provided in FIG. 10. In a first part of the Takeover subroutine 49 called Phase 1, all operating system information needed to restore the first program 39 at the point of interruption is saved and is replaced with the necessary information for running the Takeover subroutine 49 and associated application routines. The step of saving information includes changing memory stacks to prevent overwriting any data of the first program 39, saving bios data area which low level calls use as scratch space and the operating system critical section which the operating system 37 uses as scratch space. Also, during Phase 1, Takeover 49 saves the program header of first program 39 and the address of the disk transfer area, and replaces the first program header with the program header for the Takeover subroutine 49. The Takeover 49 then copies a perfect image of the area of the first program 39 which is being interrupted. The perfect image of that area is saved in a remote memory storage 65 (FIG. 7).

In an end portion of Phase 1, the Takeover 49 prepares the current display in view 26 for annotation in the invoked annotation session. To do this, if the current display is in a text mode then the Takeover reverses the relative lighting between the background and print so that the background is light and the print is dark. The display is changed to a graphics mode, and a character generation program is used to convert the text print into graphics. The Takeover subroutine 49 also saves in an original screen buffer 57 (FIG. 3a) an original copy of the current display view, in its text form in the case where it was displayed in text mode. The original copy is held in the original screen buffer 57 until use at the end of the annotation session. Takeover 49 next installs the Voice, Keyboard and Network Communications drivers. The Annotator-Desk task 20 always has the Tablet and Timer drivers loaded since they are needed by the Listener 45. Upon completion of Phase I, the Takeover subroutine 49 releases the interrupt controller 41 to enable subsequent interrupts to transfer more data points from the tablet 16 via the Tablet driver.

Takeover 49 then calls an Applications Dispatcher 47 which oversees all application routines of the Annotator-Desk task. The Applications Dispatcher 47 uses a set of codes agreed upon by all applications to determine which application routine is to be executed. There are also a set of shared variables to allow applications to leave messages for other applications.

As shown in a middle section of FIG. 10, the Applications Dispatcher 47 gets an initial start code which requests the annotator from Takeover 49 and causes the operating system 37 to perform the annotator application routine. An application can have more than one start code so that it can be told to perform a different task within the application routine. When an application routine finishes, it returns to the Applications Dispatcher 47 the code for the next desired application as indicated by the user through a selection of the "go to desk", "ruled paper" or "blank paper" option of the pop-up menu 78 (FIG. 3a). The Applications dispatcher 47 continues to execute application routines of respective applications until the code returned by an application routine tells the Applications Dispatcher 47 to end. In the preferred embodiment, the code is generated upon the user selecting the "all done" option of the menu 78. When the code to end is returned to the Applications Dispatcher 47 by an application routine, the Applications Dispatcher 47 sets a Done flag, saves all the data generated by the execution of the applications routine, and passes control to Phase 2 of Takeover to prepare to bring back the first running program 39.

In Phase 2, Takeover performs the reverse of what it did in Phase 1. Takeover removes the Keyboard, Voice and Network Communications drivers; restores the video state of the screen display; replaces the program header of the first program 39; reloads the bios data and critical section of the operating system 37; and replaces the program stack of the first program 39. Takeover 49 also changes the pointer 82 in the interrupt vector table 50 to point to the Listener. Control is returned to the operating system 37 to resume executing the first program 39 from the point of interruption.

As mentioned above with reference to the middle section of FIG. 10, the initial start code to the Applications Dispatcher 47 requests the annotator application routine. Upon receipt of this start code, the Applications dispatcher 47 calls the annotator application routine 58 illustrated in FIG. 11. In the prologue of the Annotator Application routine, the Clock/Timer of system 20 is set to zero and a variable describing the type of paper (ruled, blank) being annotated is set. Also during the prologue, the annotator application routine 58 changes the pointer 82 of the interrupt vector table 50, which corresponds to the tablet 16, to point to the tabfun dispatcher 66 as illustrated by the dashed lines 55 in FIG. 7. As stated previously, tabfun dispatcher 66 oversees a collection of tablet functions 62 and therewith processes the annotation input data from the tablet 16.

As shown in FIG. 3a, during the prologue the annotator application routine 58 also directs a screen manager to copy the first view displayed on the display unit into an erase buffer 42 and opens three files, one for information from the tablet 16, one for information from the keyboard 12 and one for information from the audio assembly 24 to be stored on disk 43. The annotator application routine 58 then creates a superfile 88 for the document of the annotation session if a superfile 88 for the document doesn't already exist. The annotator application routine next initializes the tabfun dispatcher 66 and keyfun dispatcher 64 of FIG. 3a by respectively providing initial names of a tablet function 62 and a key function 68 for processing input data from the tablet 16 and keyboard 12 respectively. In particular, the tabfun dispatcher 66 is initialized to point to a tablet function 62 called notefun dispatcher 75, and keyfun dispatcher 64 is initialized to point to a key function 68 called knotefun dispatcher 77. Notefun dispatcher 75 and knotefun dispatcher 77 are particular to the annotator where other tablet and key functions 62, 68 are particular to the system desk and desk view of FIG. 2b. The notefun and knotefun dispatchers 75, 77 oversee a group of note functions 72 and a group of keyboard note functions 74, respectively, which process the data input through the tablet 16 and keyboard 12 respectively. The notefun dispatcher 75 and knotefun dispatcher 77 have formats similar to the tabfun dispatcher 66 and keyfun dispatcher 64 illustrated above. Hence, the notefun dispatcher 75 provides a state machine approach to processing input from the tablet 16 during an annotation session, and the knotefun dispatcher 77 provides a state machine approach to processing keystrokes input through keyboard 12 during the annotation session.

The annotator application routine 58 may at any time provide a new procedure name to the tabfun dispatcher 66.

Figure 11:
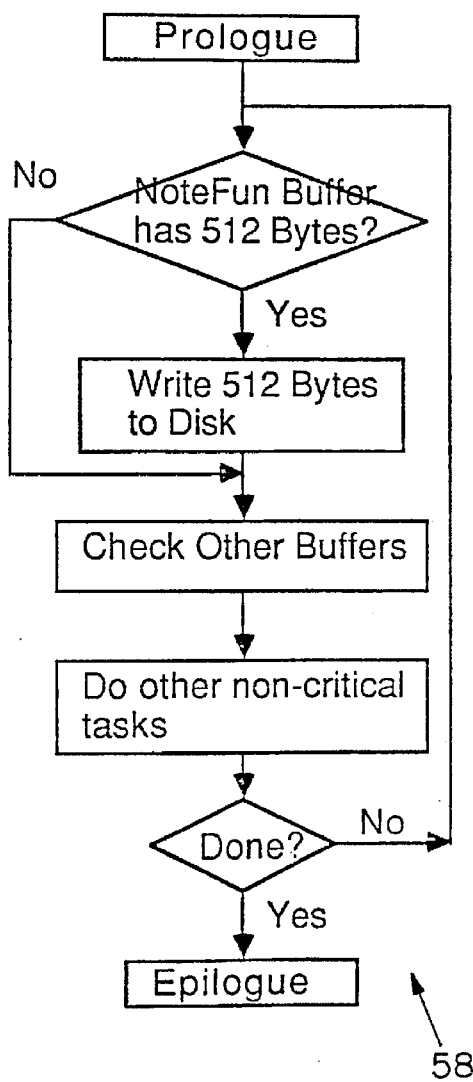

The heart of the annotation application routine is referred to as the Supervisor 58 in FIG. 3a and is shown in more detail in FIG. 11. The supervisor 58 is a loop which checks the tablet buffer 52, keyboard buffer 54 and voice buffer 56 for full disk sectors of information. If one of these buffer has 512 bytes of stored data then it is considered to have a full sector and that portion is written to a corresponding file in Disk 43. The loop continues until the Done flag is set.

Annotations input through tablet 16 by a user causes interruptions to the execution of this loop. In each interruption activated by the tablet 16, the Tablet module collects the data points indicative of an annotation from the tablet 16, transmits a formatted data packet to the operating system 37 and causes the operating system to look into the interrupt vector table 50 to determine what program to run during this interruption. The pointer 82 in the vector table has been set by the prologue of the annotator application routine to point to the tabfun dispatcher 66. In effect each data point, from the electronic tablet 16 in response to the use of the electronic stylus 14 thereon, similarly interrupts the operating system 37 and then serves as input to the tabfun dispatcher 66. In turn the tabfun dispatcher 66, having been initialized by the annotator application routine, passes control to tablet function notefun dispatcher 75.

Similarly data from keyboard 12 connected to the operating system 31 through interrupt controller 41 supplies input for the execution of the keyfun dispatcher 64 pointed to by a corresponding pointer 70 in the interrupt vector table 50 of FIG. 3a. The keyfun dispatcher 64 in turn passes control to the key function knotefun dispatcher 77 which subsequently calls keyboard note functions 74 and therewith processes keystroke input.

Preferably, a voice routine, corresponding to the audio assembly 24, for processing voice input is a separately running process which does not take processing time from processor 22 (FIG. 1a) and is already asynchronous.

Figure 12:
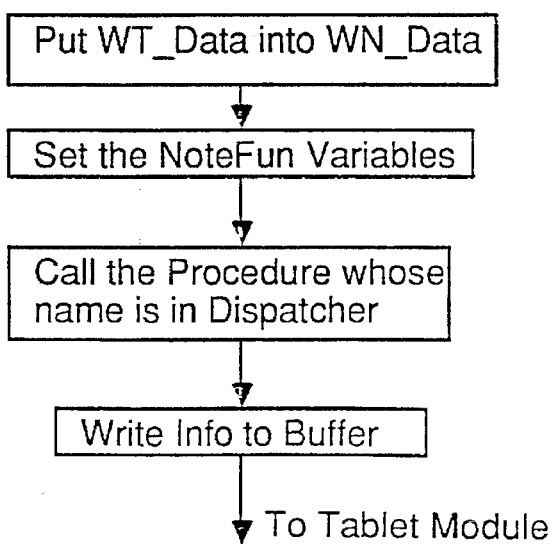

The notefun and knotefun dispatchers 75, 77 operate in a similar manner which is outlined in FIG. 12 and illustrated in FIG. 3a. For simplicity, the notefun dispatcher 75 is directly referenced in the following discussion but it is understood that the knotefun dispatcher 77 operates in a similar manner with a respective keyboard driver, keyfun dispatcher 64, keyboard note functions 74, key buffer 54 and key file 46.

Upon being called by the operating system 37 through the interrupt vector table 50 (FIG. 7), the tabfun dispatcher 66 sets variables which are commonly used throughout the running of the tabfun dispatcher 66 to indicate the current state. Included in the status of the current state are indications of which end of stylus 14 is being used, whether the user has just pressed down or picked up and end of the stylus 14, and the time of arrival of the data. These characteristics are held in a common, shared area.

The tabfun dispatcher 66 passes control to the notefun dispatcher 75. The notefun dispatcher 75 receives the data packet WT_Data from the tabfun dispatcher 66 and renames the data packet as WN_Data. The notefun dispatcher 75 places the WT_Data packet of the most recent data into the common area which is shared by the tablet and note functions 62, 72 that are called by the tabfun and notefun dispatchers 66, 75, respectively, to process input data from the tablet 16. The notefun dispatcher 75 employs the anti-skip routine on the WN_Data packet of the most recent data to determine the position of the stylus 14 and to determine what the user is doing with the stylus 14. The notefun dispatcher 75 then calls the note function 72 whose name is given to the dispatcher initially by the prologue of the annotator application routine and subsequently by the last called note function 72 (FIG. 3a).

The data packet is then processed by the note function 72 which is called by the notefun dispatcher 75. Of the note functions 72 which may be called, each processes the data in a particular way and then decides whether the note function name referenced in the notefun dispatcher 75 needs to be changed based on the state information held in the common shared area so that the notefun dispatcher calls the correct note function 72 to process the next data packet. In addition to processing the data, each note function 72 also provides the information to the screen manager 60 which subsequently updates the view on display 26 according to the information. The notefun dispatcher 75 subsequently writes the information of the data packet to a tablet buffer 52 which is common to all the tablet functions 72.

Updating the view is made a top priority and occurs every 5 msec with each data packet of information. As previously stated, when the common buffer has a sector full (512 bytes) the Supervisor 58 copies the contents of the buffer to the tablet file 44 in disk 43. Because the Supervisor 58 depends on the buffers 52, 54 and 56 and is independent of the various working procedures (i.e. note functions 72 and keyboard note functions 74) and the screen manager 60, the time lag in writing to disk 43 (i.e. disk respond/wait time) does not interfere with the updating of the view 26 on display 18 nor the processing of data. Instead, priority is given to each procedure to process the data within five millisecond time segments. Only the Supervisor 58 is then burdened with waiting for the disk 43 in order to write to disk. Further, this arrangement as shown in FIGS. 11 and 12 enables the writing to disk 43 to be done simultaneous with the displaying of the data in view 26.

Voiced/audio information is transferred by the audio assembly 24 from the user directly to a voice processing procedure 76 which digitizes and compresses the voiced/audio information and writes the compressed information to an associated voice 56 as shown in FIG. 3a. The Supervisor 58 in turn manages the writing of this information from the voice buffer 56, when a sector full exists, to a voice file 48 on disk 43.

In a preferred embodiment, there are at least six note functions 72 included in the tabfun dispatcher routine 66, pen-up, pen-down, erase-up, erase-down, menu loop and move typewriter marker. The keyboard note functions 74 employed in the keyfun dispatcher routine 64 include routines for handling arrow keys on the keyboard 12 which provide screen navigation, tabs, function keys on the keyboard, carriage returns and actual text to be displayed on the screen. The routine for handling the latter, the character handler 74, is the routine responsible for building new local grids, updating the x and y nodes and updating the grid buffer 89. It also handles the erasure or overstriking of typed test through the backspace key of keyboard 12. The voiced input is provided directly to a working procedure called the voice handler 76 discussed later.

The three inputs—the tablet 16, keyboard 12 and audio assembly 24 are processed effectively simultaneously by the respective dispatchers and procedures and by the Supervisor 58. Data which is entered from the tablet 16 has the form of seven 8-bit data packets as previously described. Subsequently, the data from the tablet 16 is digitized and transferred to the tablet buffer 52 at a resolution of about 1000 dpi. When that information is transferred to the tablet buffer 52, it is in the form of two stable values (the x and y coordinates) and a delimiter which has three parts, a code for what coordinate was changed, the new value and the time of that change. More specifically, the delimiter is used in the case where there has been no data for some predetermined amount of time or a switch in stylus-end being used, then a timemark and, if applicable, information regarding the change in stylus-end are written in the delimiter.

Information which is transmitted through the keyboard 12 is in ASCII character form. When that information is transferred to the keyboard buffer 54 it is in the form of absolute time (or change in time) and an ASCII character. Specifically, a timemark is written to the keyboard buffer 56 upon detection of the first keystroke. The keystrokes thereafter are stored with an absolute time at which the keystroke occurred in the case of slow typing or with an interval of time detected between strokes in the case of fast typing.

Figure 13:
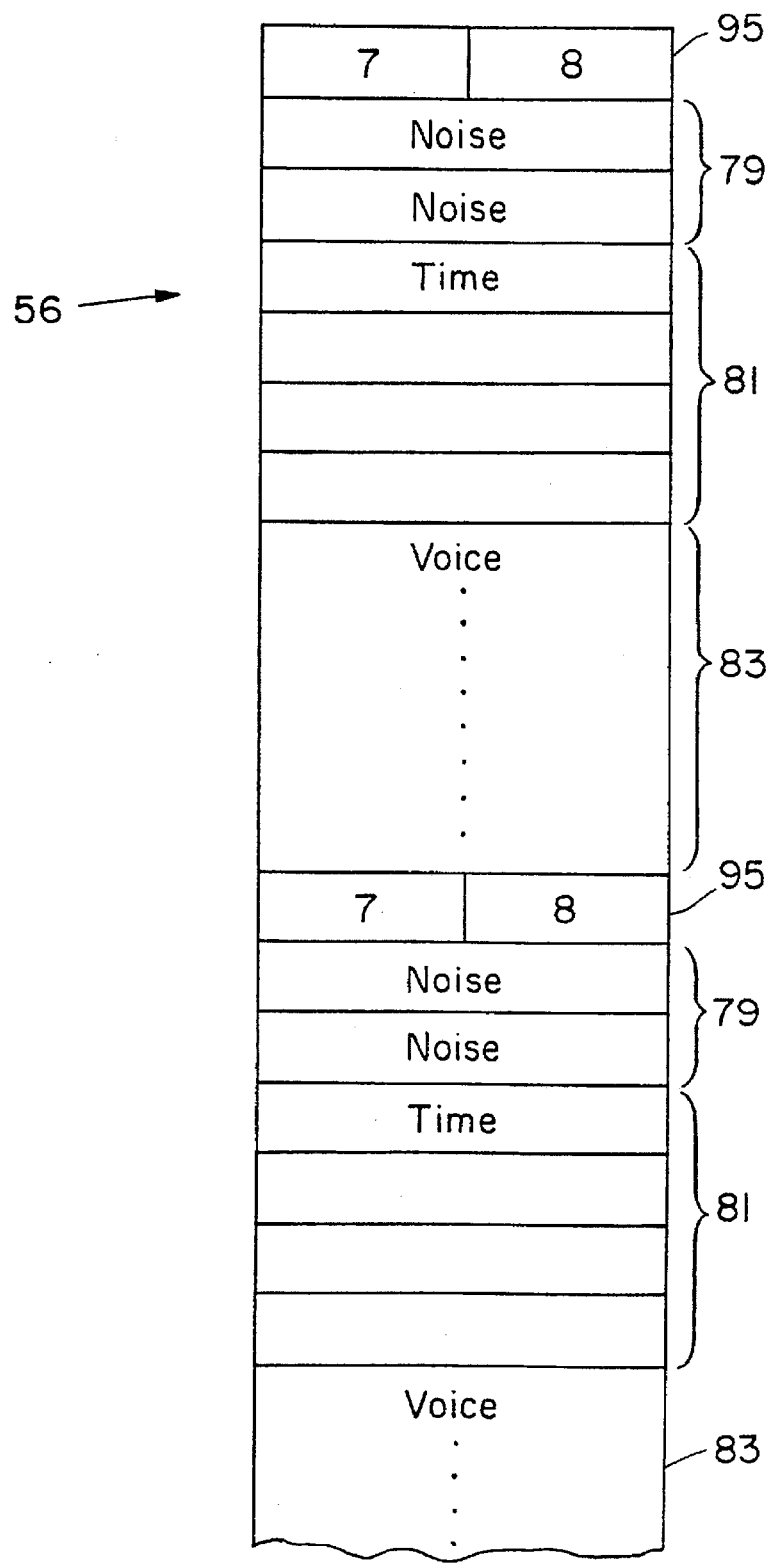

The voiced/audio information is recorded in the voice buffer 56 in a manner which enables synchronized replay with the recorded strokes and gestures of the stylus 14 and the recorded keystrokes input through keyboard 12. Further, unlike existing voice recording devices, the voiced information is recorded and saved in a fashion which compresses moments of silence or noise to avoid inefficient use of memory storage space on meaningless data. Although the actual samples of a silence period are useless, the length of the silence period is needed for synchronization of the voiced/audio information with visual annotations during playback. Silence compression and synchronization in the preferred embodiment is implemented by an encoder 85 and decoder 87 in the voice handler 76 of FIG. 3a and by voice buffer 56 shown in FIG. 13 and discussed next.

A starting time of each voice segment 83 (i.e. segment of meaningful audio information) is recorded in a four byte timemark 81. In addition to indicating the time at which a voice segment begins, the timemark 81 determines the termination time of a preceding silence period and thus the length of that silence period. Because the timemarks 81 provide an exact start time of each voice segment, as opposed to a length of time or time differential, timing errors during replay are limited to a single voice segment and are prevented from propagating and accumulating. Specifically, once the decoder 87 begins replaying a voice segment 83, the decoder 87 does not interrupt the voice segment to recover any timing error. Instead, recovery for a timing error occurs during the following silence period, and the succeeding voice segment 83 begins at the time indicated by the respective timemark 81. Preferably, the host system clock is used as a unique reference of time for the tablet digitizer and the voice digitizer, timemarks 81 in voice buffer 56 being relative to the beginning of that clock.

When a decrease in volume energy is sensed for greater than a preset amount of time, for example about 0.1 second, before a successive increase in volume energy, the encoder 85 records in voice buffer 56 a reserved code 95 indicating the end of a voice segment 83 followed by a two byte code 79 of the current noise level and the timemark 81 of the next voice segment. In the preferred embodiment, the reserved code 95 is one byte long and has values seven followed by eight. This code is not allowed for the voice segments 83 and is always followed by a noise code 79 and timemark 81.

During the recording of a voice segment 83, the encoder 85 receives digitized voice codes representing the voiced/audio information and prevents a seven followed by an eight from being recorded. If an eight is currently being saved in a voice segment 83, the encoder 85 checks the previous recorded voice code. If the previous voice code is a seven, then the eight is minimally changed to a new value and the new value is saved in the byte where the eight would have been recorded. Such a minimal deviation in actual voice code, plus the low probability of obtaining a seven followed by an eight voice code and the sampling of four bits 8,000 times a second enables integrity of the voiced/audio information to be maintained.

During a sensed silence period, the encoder 85 saves a background energy level of that silence period in noise code 79. Preferably, the encoder 85 determines the existence of a silence period by comparing a long term average of sensed energy level to a short term average of sensed energy level. The long term average is a moving average over several samplings and represents detected background noise. The short term average represents the current local energy level. If the long term average equals the short term average then there is a silence period. The energy level is measured and saved in noise code 79 for that silence period.

The decoder 87 during replay checks for the reserved code 95. Each time the reserved code 95 is detected the succeeding noise code 79 is decoded and subsequently used to determine the volume of the silence period. The decoder 87 employs an artificial noise generator to provide noise at the determined volume until the start time of the next voice segment 83 as indicated by the timemark 81. At the start time of the voice segment, the decoder 87 decodes the voice codes recorded in voice segment 83 and generates the voiced/audio information through audio assembly 24. Thus, the decoder decides when and how to generate the artificial noise and the voiced information without instructions from the host.

The foregoing arrangement reproduces voiced/audio information in a more natural sounding manner without actually recording samples of the silence periods. To make the reproduced voice information sound more natural but without recording the silence samples, the decoder inserts an artificial noise in the silence periods instead of a period of absolute silence because human ears are sensitive to abrupt absolute silences between voice segments. The absolute silences make the voice segments sound like separate pieces rather than a message from a single recording. This is due to the background noise and reverberations which are overwhelmed by the voice level but become noticeable as a continuation between voice segments. In addition, the level of the noise is calculated during recording as described above and on replay provides a more natural sounding message with respect to volume.

In the preferred embodiment, long periods (greater than about ¼ sec) of user inactivity are similarly detected by decreased energy level signals and non-meaningful stylus and keyboard signals. During replay, processor 22 extracts these relatively long periods of inactivity to produce a more flowing view of the annotations input through the stylus 14, keyboard 12 and audio assembly 24 as discussed later.

The screen manager 60 utilizes a screen buffer 40 which holds a working bitmap copy of the document being annotated. This bitmap holds the image currently displayed to the user and is updated by the screen manager 60 in accordance with the newly received information/data of each data packet.

The Supervisor 58 also analyzes the amount of time between data points. Once the Supervisor 58 detects a lull in new data, for example due to a user pausing after having inserted all desired annotations, the Supervisor 58 then invokes a menu routine. This is accomplished by the Supervisor 58 providing the menu routine name to the tabfun dispatcher 62. The tabfun dispatcher 62 calls the menu routine. The menu routine directs the screen manager 60 to display in the view 26 a pop-up menu 78 which provides the choices of:

go to desk,
blank paper,
ruled paper,
erase notes,
playback,
shrink menu,
hide ruler,
all done.

If the "go to desk" choice is made by the user "touching and lifting" one end of stylus 14 on the corresponding position of tablet 16, the menu routine sets the Done flag to signal to the Supervisor 58 that the user is finished with the current annotation session. After the Done flag is set and the Supervisor 58 detects the Done flag, the Supervisor 58 is exited and the epilogue of the annotator applications routine is entered. Execution of the epilogue places the dispatchers 62, 64 for the tablet and keyboard and the voice handler 76 in an idle loop so that they no longer process further input data, and closes tablet, keyboard and voice files 44, 46, 48 to disk 43. The annotator applications routine then looks at and makes a note of the previously set paper variable to see the type of paper on which the user has been annotating.

The annotator applications routine then makes a request to the screen manager 60 (FIG. 3a) to put a copy of the working bitmap for the last view shown to the user from the current screen buffer 40 into intermediate file 84 and the original view information in the original screen buffer 57 into original screen file 86. If the original view was from a text mode display then the ASCII characters are saved in a 4K file. These characters are resolution independent and may be printed at any resolution by a printer. If the view screen was from a graphic mode display, then just the bitmap of video buffer is saved in a 32K file.

The epilogue of the annotator applications routine then tells the screen manager 60 to make a shrunken image of the last view displayed at the end of the annotation session and to store it in a stamp file 80. The annotator application routine then completes the superfile 88 (or updates an existing superfile 88) for the document which was annotated during the session. In the superfile, the annotator application routine provides an indication of the kind of view (paper) that was annotated, the last open page of the document, the page number of the document which was annotated, whether the keyboard was used, whether the eraser end 28 of the stylus 14 was used, whether voice was used and whether the writing tip end 30 of the stylus 14 was used. The superfile 88 also includes the names of the files for the tablet, keyboard and voice files as described previously. If the annotation session created a brand new document then the superfile 88 indicates that fact. After execution of the epilogue of the annotator applications routine control is returned to the Application Dispatcher 47 (FIG. 10) with a code to perform the desk application routine.

If the "blank paper" or "ruled paper" options are chosen by the user from the menu 78, then the Supervisor 58 saves all the annotation work done so far in the current session and provides a new annotation session with a fresh view through the screen manager 60 (FIG. 3a). The fresh view displays either a blank paper or paper with lines, respectively.

In response to the "erase notes" option, the Supervisor 58 deletes all annotations inputted so far in the current annotation session and provides the initial view of the document from the beginning of the annotation session through the screen manager 60. Conveniently, the erase buffer 42 holds a bit map of the desired initial view of the document and may be copied to the current screen buffer 40 to provide the "erased" view of the document free of any annotations inputted thus far in the current annotation.

The "shrink menu" option of the pop-up menu 78 enables the user to prevent the menu 78 from interfering with the rest of the images displayed on the screen 18.

The "hide/show ruler" menu option enables the user to either prevent display of or cause redisplay of an indicator of the left and right margins and tabs of the document. Any such indicator, or ruler as is known in the art, is suitable but is preferably provided through a handler routine similar to the character handler 74 both of which are keyboard note functions called by the knotefun dispatcher 77.

In response to the user selecting the "playback" menu option, the Supervisor 58 provides all files generated from annotation sessions of the document, as indexed by the superfile 88 of the document, to the notefun dispatcher 75, knotefun dispatcher 77 and voice handler 76 (FIG. 3a). This causes the screen manager 60 to replay through screen display 18 a timed sequence of the origination of the document and all annotations made to it thus far at the pace in which such annotation was originally inputted by the user.

The "all done" option on the pop-up menu 78 provides the same supervisor routine as in the "go to desk" option but control is returned to the Applications Dispatcher 47 with a code, in which the Done flag is set, to return to the first program 39 that the operating system 37 was running before the annotator was invoked. The Applications Dispatcher 47 interprets the code, saves all the information generated by the annotation session and passes control to Phase 2 (FIG. 10) of the Takeover routine as described previously.

Software for Erasure

In order to erase what was currently written during an annotation session, the Supervisor copies an image of the view into the erase buffer 42 at the beginning of the annotation session. During the pen-up and pen-down procedures 72 (FIG. 3a), the procedure provides the screen manager 60 information regarding a starting point and an ending point of a stroke of the stylus and a color (i.e. black or white) of any annotation to the document which was generated by that stroke. Similarly, during the erase-up and erase-down procedures 72 (FIG. 3a), the procedure tells the screen manager 60 a beginning and an ending point of an eraser path by which any portion of penned annotations that intersect the path are determined to be "erased". During erasure, the screen manager 60 looks to the saved bitmap in the erase buffer 42 to determine what originally existed between the two specified points. The screen manager 60 replaces all points between and including the specified points with the corresponding original bits saved in the erase buffer 42. Next the screen manager 60 reconstructs in real time all typed annotations within the eraser path. This is accomplished by first determining the x-y coordinates of the eraser path, then searching the linked list of x and y nodes to determine which typed characters either intersect or are currently defined within the eraser path, and accessing through the grid buffer 89 the ASCII codes of the affected typed characters. Screen manager 60 quickly rewrites the characters into view 26 with no discernible flicker.

If the paper variable is set to white paper or ruled paper, then the screen manager 60 does not refer to the erase buffer 42. Instead, white pixels are displayed along the eraser path defined between the ending and beginning points of erasure, and in the case of the ruled paper, the ruled lines are reinstated on otherwise blank background. Typed annotations within the eraser path are then reconstructed as described above.

Replay or Printing

During printing or playback of the annotation session, a print application routine or playback application routine respectively is used. The respective application routine provides the notefun dispatcher 75 with an initial note function 72 name and opens the appropriate files 44, 46, 48 on disk 43. Within the application routine, an event manager reads the tablet, keyboard and voice files 44, 46, 48 generated for the document. The event manager decides which data came first according to the time headings stored in each file with each block of data. The blocks of data are then placed in respective data packages and given in order of time to the proper dispatcher (i.e. notefun or knotefun). The information is then inputted through the respective dispatchers 75, 77, subsequently processed by corresponding functions employed by the notefun dispatcher 75 and knotefun dispatcher 77, and displayed on screen display 18 as directed by the screen manager 60 or printed on a connected printer as directed by a printer manager 59 (FIG. 3a) of the application routine.

Thus playback, printing and annotation is done from the same working procedures (i.e. note functions 72, keyboard note functions 74), dispatchers 75, 77 and files to disk 43. This is made possible due to the fact that the applications using the information in the files have to do tasks similar to those performed in the annotation routine. For example, when a user is annotating, the notefun dispatcher 75 provides a state machine in which an input packet (WT_Data) results in a line drawn in the screen view 26. This is also true when a user is viewing playback. If the playback application routine passes the notefun dispatcher 75 a WT_Data packet, all else being the same, the notefun dispatcher provides the drawing of the same line in the screen view 26. In the printing application, the desired result is that the line be drawn at the printer. This is realized by the application routine sending information to the printer instead of making an explicit call to the Graphics module to draw the line. Hence replay and printing of the document and annotations thereto are accomplished in a time sequence of the annotations as originally input by the user and not in spacial order relative to the document.

In addition, during replay, relatively long periods of inactivity from the user not inputting any annotations through the stylus 14, keyboard 12 and audio assembly 24 are extracted to provide a more flowing representation of the creation and annotation of the document. Such extraction is accomplished by the event manager or other processor means detecting the relatively long periods of inactivity through the recorded timemarks in the tablet, keyboard and voice files 44, 46, 48 and processing the recorded annotation data which is next in time instead of the noise data of the detected period of inactivity.

Loading Software

When the user executes the software program/file of system 20 (i.e. the Annotator-Desk task program), the operating system 37 loads in the entire software package including the device drivers, the Listener 45 and Takeover 49 modules and the various application routines. The system program/file installs the Tablet and Timer drivers and passes control to the Listener 45. It then does a TSR (terminate and stay resident routine). This allows the system 20 software program/file to remain in local memory. Subsequent applications must run in the remaining part of local memory. Since the system program/file is large, this often prevents operation of other programs.

An alternative program/file for loading is available. It consists of a Listener 45 and a different Takeover module, the Tablet and Timer drivers and an image save/load module. When the user executes this file instead of the system program/file, the operating system 37 loads in this small loading program/file. It installs the Tablet and Timer drivers but before giving control to the Listener 45, it loads the system program/file and determines the amount of local memory required to hold it. It then saves a copy of the local memory required to hold it. It then saves a copy of the local memory containing the system program/file to a disk file. This memory area is then declared free for future applications to use and control is given to the Listener 45. When the Takeover 49 module is activated, it saves the program stack, data area and program header as usual but before obtaining the video state, it needs to copy the disk file containing the system program/file back into local memory where it is expected to be. Before it does this, however, it must save that block of local memory to another disk file, such as memory area 65 (FIG. 7), because it may contain the interrupted program and must not be damaged. The rest of the Takeover module continues as previously described.

While the invention has been particularly shown and described with reference to a preferred embodiment thereof, it will be understood by those skilled in the art that various changes in form and details may be made therein without departing from the spirit and scope of the invention as defined by the appended claims. For example, although presently implemented in software, many of the details of the system may be implemented in hardware for faster operation. And many features of the system may be advantageously used without use of all features. For example, though the two-ended stylus is a preferred annotation tool, an electronic mouse would also have some annotation utility, or a single ended stylus could operate in two different modes writing and erasing, or erasure of penned annotations could be accomplished through the keyboard.

We claim:

1. A data processing system comprising:
   a processor programmed with an annotation program;
   a memory including annotation files and image files;
   a display coupled to said processor displaying views generated during execution of said annotation program; and
   a keystroke annotation input device coupled to said processor, said processor:
   displaying an annotatable image;
   accepting keystroke annotation input from said annotation input device, each input of said sequence which is subsequent to a first input being entered in a sequential relationship to a prior input, and displaying a composite image comprising said annotatable image and the corresponding keystroke annotations; and
   storing said composite image, said annotatable image and said annotations along with said sequential relationships between said annotation inputs.

2. A data processing system comprising:
   a display coupled to a processor displaying views generated during execution of an annotation program;
   a memory;
   an annotation input device coupled to a processor;
   said processor comprising,
   means for displaying an annotatable image;
   means for accepting a sequence of annotations input from said annotation input device;
   means for displaying said sequence of annotation input superimposed on corresponding portion of said annotatable image defining a composite image;
   means for storing said composite image,
   means for storing said annotatable image; and
   means for storing said sequence of annotations and for storing time information indicative of a time duration between said inputs.

3. A data processing system comprising
   a programmed processor including an annotation program for annotating annotatable bit map images, a memory,
   an annotation input device coupled to said processor and
   a display coupled to said processor for displaying views generated by the programmed processor,
   said programmed processor including
   receiving means for accepting annotation inputs from said annotation
   input device for annotating an annotatable image and means for accepting information relating to the order of occurrence and timing of a sequence of annotation inputs and
   screen means coupled to the display and including a screen buffer for storing an annotatable image or a composite image comprising an annotatable image and annotations received from the annotation input device for displaying said annotatable image or said composite image at the display and
   file means for storing a composite image in said memory,
   for storing the annotations,
   for storing the order of occurrence and timing information and
   for associating the annotations and the occurrence and timing information with an annotatable image.

4. A system as claimed in claim 3 wherein said programmed processor includes
   means for applying a sequence of annotations associated with an annotatable image from the file means to the display device to display annotations with an annotatable image in an order of occurrence and with timing related to the sequence of annotations made to the annotatable image.

5. A system as claimed in claim 4 wherein the annotation program further includes
   means for displaying annotations sequentially in time at a pace which is determinable by the user of the data processing system.

6. A data processing system comprising
   a programmed processor including an annotation program for annotating annotatable bit map image,
   a memory,
   an annotation input device coupled to said processor and
   a display coupled to said processor for displaying views generated by the programmed processor,
   said programmed processor including
   receiving means for accepting annotation inputs from said annotation input device for annotating an annotatable image,
   screen means coupled to the display and including a screen buffer for storing an annotatable image or a composite image comprising an annotatable image and annotations received from the annotation input device for displaying said annotatable image or said composite image at the display and file means for storing a composite image in said memory and for storing timing information associated with annotations received from the annotation input device wherein said programmed processor further includes means for writing annotations from the file means onto an annotatable image in the screen buffer for display on the display device in the same sequential order in space and time and at a pace relating to a pace associated with the stored timing information.

7. A data processing system comprising a programmed processor including an annotation program for annotating annotatable bit map images, a memory, an audio output means coupled to the processor for generating an audio output in response to electrical audio input signals, an annotation input device coupled to said processor including an audio annotation input means for generating audio electrical signals from audio input, a display coupled to said processor for displaying views generated by the programmed processor, said programmed processor including receiving means for accepting annotation inputs from said annotation input device for annotating an annotatable image, screen means coupled to the display and including a screen buffer for storing an annotatable image or a composite image comprising an annotatable image and annotations received from the annotation input device for displaying said annotatable image or said composite image at the display, file means for storing a composite image in said memory and an audio annotation program comprising audio file means for storing representations of audio input signals received from the audio input means and means for providing audio annotations associated with an annotatable image from the audio file means to said audio output means to produce a corresponding audio output in the same relative sequence as the audio input to said system, means for detecting periods of relative silence among a plurality of audio signals, means for digitally encoding said audio signals except during said periods of relative silence, means for encoding an indication of time at which periods of relative silence end and means for reproducing said audio signals with said periods of relative silence inserted at the appropriate times indicated by said encoded indication of time marking the end of a silent period.

8. A data processing system comprising a programmed processor including an annotation program for annotating annotatable bit map images, a memory, an annotation input device coupled to said processor and a display means coupled to said processor for displaying views generated by the programmed processor, said programmed processor including receiving means for accepting a sequence of annotation inputs from said annotation input device, screen means for displaying an annotatable image or a composite image comprising an annotatable image and annotations received from the annotation input device at the display and file means for storing annotation inputs including the sequence of occurrence of the annotation inputs.

9. The system of claim 8 wherein said programmed processor screen means further includes means for applying a sequence of annotations associated with an annotatable image from the file means to the display device to display annotations with an annotatable image in an order of occurrence and with timing related to the sequence of annotations.

10. The system of claim 8 wherein said programmed processor further includes means for receiving time information indicative of the time duration among the sequence of annotation inputs for use during subsequent display of said annotations for displaying the annotations sequentially over said time durations.

11. The system of claim 8 wherein said file means further includes means for storing said annotatable image, said annotations and said sequence of annotations, and means for storing time information indicative of a time duration between said inputs during a subsequent replay of said annotations for displaying the annotations sequentially over said time durations.

* * * * *